(12) United States Patent
Otaka et al.

(10) Patent No.: US 7,883,273 B2
(45) Date of Patent: Feb. 8, 2011

(54) CAGE FOR ROLLER BEARING

(75) Inventors: Kazuhiko Otaka, Shibuya-ku (JP); Junichi Uneya, Hiratsuka (JP); Yoshihiko Shirosaki, Fujisawa (JP); Yukio Sato, Yokohama (JP); Takashi Yamamoto, Yokohama (JP); Tasuku Suzuki, Fujisawa (JP)

(73) Assignee: NSK Ltd., Tokyo (JP)

( * ) Notice: Subject to any disclaimer, the term of this patent is extended or adjusted under 35 U.S.C. 154(b) by 1422 days.

(21) Appl. No.: 10/556,469

(22) PCT Filed: May 12, 2004

(86) PCT No.: PCT/JP2004/006394

§ 371 (c)(1), (2), (4) Date: Nov. 10, 2005

(87) PCT Pub. No.: WO2004/099636

PCT Pub. Date: Nov. 18, 2004

(65) Prior Publication Data

US 2006/0239601 A1 Oct. 26, 2006

(30) Foreign Application Priority Data

| May 12, 2003 | (JP) | ............................. 2003-132896 |
| Aug. 7, 2003 | (JP) | ............................. 2003-206549 |
| Oct. 17, 2003 | (JP) | ............................. 2003-358338 |
| Apr. 26, 2004 | (JP) | ............................. 2004-129959 |

(51) Int. Cl.
*F16C 33/52* (2006.01)

(52) U.S. Cl. .................. 384/572; 384/574; 384/579

(58) Field of Classification Search .................. 384/572, 384/574, 575, 579
See application file for complete search history.

(56) References Cited

U.S. PATENT DOCUMENTS 6,022,147 A 2/2000 Murai et al.

FOREIGN PATENT DOCUMENTS

| DE | 185 399 C | 10/1905 |
| DE | 91 09 881 U1 | 10/1991 |
| DE | 198 45 747 A1 | 4/1999 |
| DE | 100 31 427 A1 | 1/2002 |
| JP | 52-111853 U | 8/1977 |
| JP | 66-115033 | 9/1981 |
| JP | 67-160426 | 10/1982 |
| JP | 60-182525 U | 12/1985 |
| JP | 60-182526 U | 12/1986 |

(Continued)

OTHER PUBLICATIONS

German Office Action dated Jan. 24, 2007 with an English translation of the pertinent portions (Eight (8) pages).

(Continued)

*Primary Examiner*—William C Joyce
(74) *Attorney, Agent, or Firm*—Crowell & Moring LLP

(57) ABSTRACT

An end portion of a pin 2 rotatably supporting a rolling body 1 is fitted in a pin-receiving hole 4 formed in an annular side plate 3. The pin-receiving hole 4 has interference in a range from 5 to 40 μm between itself and the outer diameter of the pin 2. The end portion of the pin 2 pressed in the pin-receiving hole 4 with 5-40 μm interference is welded to the annular side plate 3.

16 Claims, 27 Drawing Sheets

FOREIGN PATENT DOCUMENTS

| | | |
|---|---|---|
| JP | 60-182527 U | 12/1986 |
| JP | 63-119931 U | 8/1988 |
| JP | 63-193119 U | 12/1988 |
| JP | 5-172211 A | 7/1993 |
| JP | 8-91530 A | 4/1996 |
| JP | 10-005899 A | 1/1998 |
| JP | 11-61062 A | 2/1999 |
| JP | 11-201170 A | 7/1999 |
| JP | 11-325063 A | 11/1999 |
| JP | 2002-98153 A | 4/2002 |
| JP | 2002-372053 A | 12/2002 |

OTHER PUBLICATIONS

Edited by Japanese Standards Association, 'Sunpo Kosa Oyobi Hameai B 0401' JIS Handbook Kikai Yoso, Japanese Standards Association, Apr. 20, 1995, pp. 441 to 470.

International Search Report, dated Aug. 31, 2004 Three (3) pages.

Japanese Office Action dated Apr. 27, 2010 with Partial English translation (five (5) pages).

CAGE FOR ROLLER BEARING

TECHNICAL FIELD

The present invention concerns a cage for use in a roller bearing such as a cylindrical roller bearing or a tapered roller bearing and, particularly, it relates to a cage for use in a roller bearing referred to as a pin-type.

BACKGROUND ART

In a rolling bearing used, for example, in a speed retarder of a rolling mill or a press machine, since abrupt fluctuation of load occurs repetitively in the radial direction, rolling elements formed in a cylindrical or conical shape are used as rolling elements assembled between an outer bearing ring and an inner bearing ring. A cage for retaining rolling elements of such rolling bearings (hereinafter referred to as a "roller bearing") includes various types and those referred to as a pin-type cage are constituted such that one ends of pins inserted through the central hole of a roller (rolling element) is fitted into pin-receiving holes formed in one annular side plate of a pair of annular side plates opposed to each other while putting the roller therebetween, and the annular side plate and the pins are welded so as to cover the entire end faces of the pins that are fitting into the pin-receiving holes as disclosed, for example, in JP60-182525U or JP11-325063A.

However, in the pin-type cage described above, as shown in FIG. 49, since the hole diameter of the pin-receiving hole 4 is larger than the outer diameter of the end of the pin 2, a gap g is formed between the pin-receiving hole 4 formed in the annular side plate 3 and the pin. Therefore, when a load in the radial direction is applied on the pin 2, stress concentration occurs to a weld portion 6 for the pin 2 and the annular side plate 3 to possibly cause fracture such as cracking due to stress concentration caused to the weld portion 6.

Further, in the existent pin-type cage, since the annular side plate 3 and the pin 2 are welded so as to cover the entire end face of the pin 2 fitting into the pin-receiving hole 4 in order to prevent cracking or the like in the weld portion due to stress concentration, a residual tensile stress is generated to the weld portion 6 for the pin 2 and the annular side plate 3 to result in a problem of lowering the strength.

Further, in the pin-type cage described in JP11-325063A, when a rolling element moves largely toward the annular side plate and is in contact with the pin, it may be sometimes in contact with a portion with no surface hardening layer or a portion where the depth of the surface hardening layer is shallow. Further, at the pin surface where the surface hardening layer is not formed, the mechanical strength to the bending stress is also low in addition to the wear resistance, compared with a portion where the surface hardening layer is formed.

DISCLOSURE OF THE INVENTION

An object of the present invention is to provide a cage for use in a pin-type roller bearing excellent in mechanical strength by suppressing concentration of stress to a weld portion for a pin and an annular side plate.

A cage for use in a roller bearing according the first invention comprises a plurality of pins for rotatably supporting rolling elements of a roller bearing and a pair of annular side plates for retaining, by way of the pins, the rolling elements each at an equal distance in the circumferential direction of a bearing ring, in which pin-receiving hole for fitting with one ends of the pins are formed to at least one annular side plate in the pair of annular side plates, wherein fitting between the pins and the pin-receiving holes is applied as interference fit for 5 µm or more.

In the cage for use in the roller bearing according to the first invention, fitting between the pins and the pin-receiving holes is preferably interference fit for 5 µm or more and 40 µm or less. Further, it is preferred that the ends of the pins fitting into the pin-receiving holes are welded to the annular side plate, the annular side plate has weld portions for the pins and the annular side plate at the outer lateral surface, and the weld portions are formed into a ring shape substantially at constant width. In this case, the weld portions are preferably formed by TIG welding or plasma welding for the pins and the annular side plate. Further, it is desirable that the extension amount of the weld portions of the annular side plate relative to the outer lateral surface thereof is within 0.5 mm.

Further, in the cage for use in the roller bearing according to the first invention, the ends of the pins fitting into the pin-receiving holes are preferably finished by grinding and, further, the pin-receiving holes have a surface roughness, preferably, of 1.2 µm or less. Further, the ends of the pins fitting into the pin-receiving holes may be applied with surface fabrication by a method such as barrel fabrication, honing fabrication or electrolytic polishing.

Further, in the cage for use in the roller bearing according to the first invention, the pin-receiving holes may be formed in both of the pair of annular side plates. In this case, one of the two ends of the pin is preferably formed to a smaller diameter than that of the other end.

Further, it is preferred that the pins have a shaft portion passing through a rolling element insertion hole formed in the axial core of the rolling element and the two ends of the pins fitting into the pin-receiving holes are formed to a larger diameter than that of the shaft portion. In this case, the pins may have a chamfered portion at the top end face thereof, and the angle of inclination at the chamfered portion is preferably 30° or less relative to the outer circumferential surface of the pin. In this case, the chamfered portion is preferably formed into an arcuate shape along the axial direction of the pin.

Further, the pin-receiving holes preferably have a chamfered portion at the inner surface of the annular side plate. Further, the pins may have a tapered portion between the shaft portion and a rear end thereof. In this case, the angle of inclination for the tapered portion is preferably 30° or less relative to the outer circumferential surface of the pin, and the boundary between the rear end of the pin and the shaft portion is preferably chamfered in an arcuate shape along the axial direction of the pin.

Further, the pins may have a surface hardening layer at the surface layer of the shaft portion and, assuming the entire length of the pin as $L_1$, the axial length between the two ends of the pin as $L_2$, and the region for forming the surface hardening layer in the axial direction of the pin as $L_3$, they are preferably defined as: $L_2-2>L_3>L_1-2L_2$. Further, assuming the region for forming the surface hardening layer in the axial direction of the pin as $L_3$ and the thickness of the annular side plate as T, it is preferred that they are defined as: $L_1-2T>L_3>L_1-2L_2$.

In this case, the surface hardening layer is preferably formed by controlling an RF current supplied to RF induction heating coils used upon RF quenching the circumferential surface of the pin, or a relative moving speed of the RF induction heating coils to the pin separately for both ends of the pin and other portions.

Further, a cage for use in a roller bearing according to a second invention comprises a plurality of pins for rotatably supporting rolling elements of a roller bearing, a pair of annular side plates for retaining, by way of the pins, the rolling elements each at an equal distance in the circumferential direction of a bearing ring, and a plurality of bushes each having, at a central portion, a tapered hole for fitting with a tapered portion formed at one end of the pins in which fitting holes for fitting with the bushes are formed to at least one annular side plate of the pair of annular side plates, wherein fitting between the bushes and the fitting holes is applied as interference fit for 5 μm or more.

According to the cage for use in the roller bearing according to the inventions, since the joining strength between the pins and the annular side plate can be ensured without constituting the weld portions for the pins and the annular side plate as in the existent weld portions, this can prevent concentration of stress to the weld portions for the pins and the annular side plate or occurrence of cracking, etc. Further, this can also prevent occurrence of fretting or the like to the fitted portions between the pins and the pin-receiving holes.

According to the cage for use in the roller bearing, the axial length of the rolling element can be ensured longer than that in the existent case in addition to the effect described above.

According to the cage for use in the roller bearing, occurrence of scraping can be prevented upon fitting the ends of the pins into the pin-receiving holes of the annular side plate in addition to the effects described above.

According to the cage for use in the roller bearing, since the pins can be fit from one direction into the pin-receiving holes formed in the annular side plate, the cage can be assembled easily.

According to the cage for use in the roller bearing, occurrence of burrs can be prevented upon fitting the ends of the pins into the pin-receiving holes of the annular side plate in addition to the effects described above.

According to the cage for use in the roller bearing, since large wear at the end of the pin due to contact with a rolling element can be suppressed even when the rolling element moves greatly toward the annular side plate during use, the mechanical strength of the pin against the bending strength can be improved. Further, wear of the pin by fretting in the fitting portion between the annular side plate and the pin can be suppressed and occurrence of abnormal wear that may possibly form trigger points for stress concentration to the pin can be prevented.

According to the cage for use in the roller bearing, a surface hardening layer of a uniform depth can be formed to the circumferential surface of the pin even when the outer diameter is different between the central portion and the both ends of the pin.

According to the cage for use in the roller bearing, since the joining strength between the bush and the annular side plate can be ensured without constituting the weld portion for the bush and the annular side plate as in the existent weld portion, occurrence of stress concentration to the weld portion for the bush and the annular side plate can be suppressed.

BEST MODE FOR PRACTICING THE INVENTION

Embodiments of the present invention are to be described with reference to the drawings.

Figure 1:
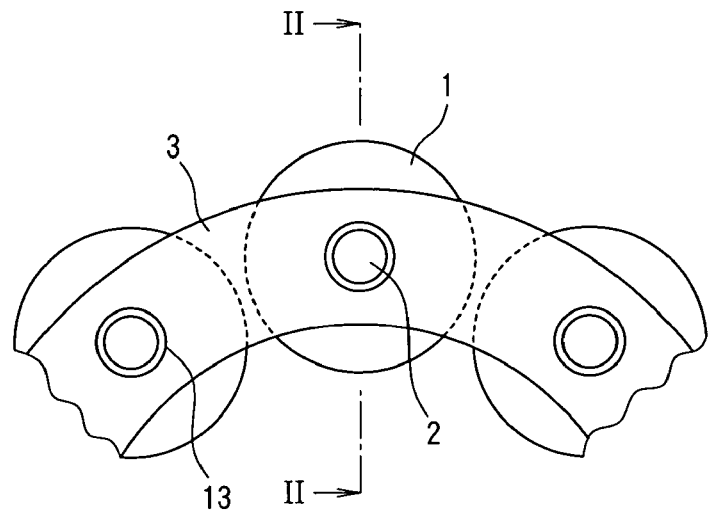
FIG. 1 is a side elevational view showing a portion of a cage for use in a roller bearing according to a first embodiment of the present invention.
Figure 2:
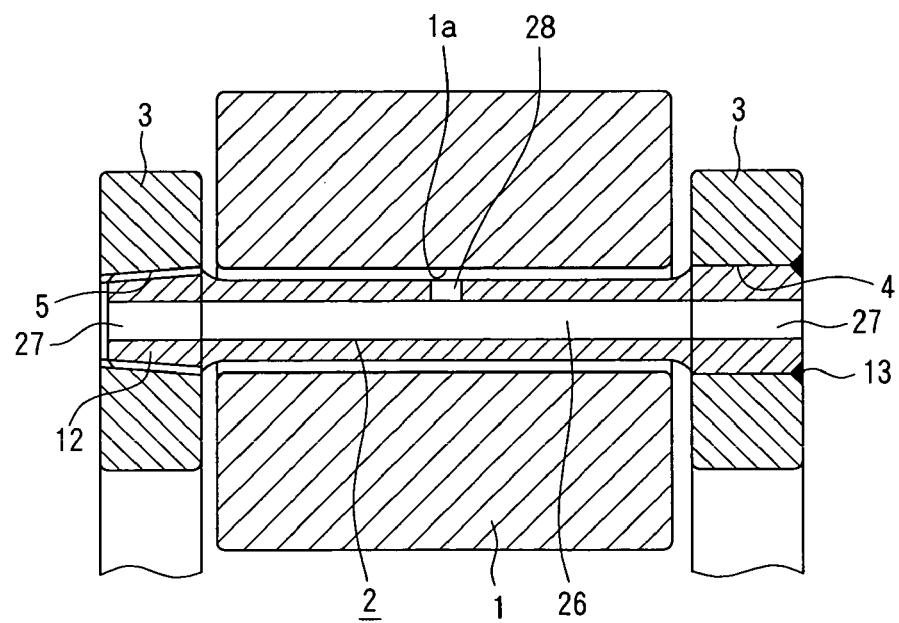
FIG. 2 is II-II cross sectional view of FIG. 1.

A cage for use in a roller bearing according to a first embodiment of the present invention comprises, as shown in FIG. 1 and FIG. 2, a plurality of pins 2 for rotatably supporting rolling elements 1 of a cylindrical roller bearing and a pair of annular side plates 3, 3 for retaining the rolling elements 1, by way of the pins, each at an equal-distance in the circumferential direction of a bearing ring not illustrated.

The annular side plates 3, 3 are opposed to each other putting rolling elements 1 each formed into a cylindrical roller shape therebetween and, in the annular side plates 3, an annular side plate 3 on the left in FIG. 2 is formed with a plurality of threaded holes 5 in thread engagement with tapered threaded portions 12 each formed at one end of the pin 2 at a predetermined distance in the circumferential direction of the annular side plate 3.

On the other hand, a plurality of pin-receiving holes 4 are perforated each at a predetermined distance in the circumferential direction of the annular side plate 3 to the annular side plate 3 on the left in FIG. 2, and one end of the pin 2 on the side opposite to the threaded portion 12 is fitting into each of the pin-receiving holes 4 by interference fit for about 5 to 40 μm.

The end of the pin 2 fitting into the pin-receiving hole 4 is welded to the annular side plate 3, and a weld portions 13 for the pins 2 and the annular side plate 3 are formed in a ring-shape substantially at a constant welding width to the outer lateral surface of the annular side plate 3 having the pin-receiving holes 4.

The pin 2 is formed of an iron and steel material such as SNCN 431, S35C, S38C, etc., and a carburized hardening layer 11 as a surface hardening layer (refer to FIG. 7) is formed to the surface layer of each pin 2. Further, a lubricant supply channel 26 is formed at the center of the pin 2 (refer to FIG. 2). The lubricant supply channel 26 has lubricant inlets 27 on both end faces, and a lubricant such as grease flowing into the lubricant supply channel 26 from the lubricant inlets 27 is discharged from a lubricant exit 28 formed to a central portion at the outer circumferential surface of the pin 2. Further, a pin insertion hole 1a is formed to the center of the rolling element 1 for passing the pin 2.

Figure 49:
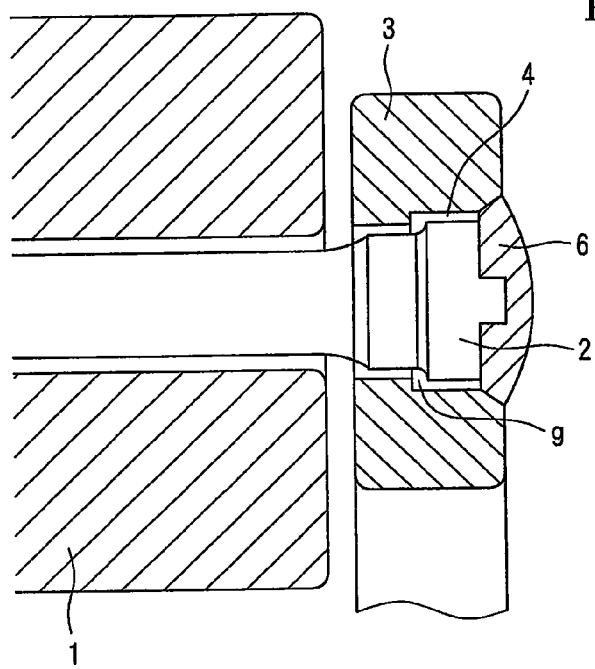
FIG. 49 is a view showing an example of an existent pin-type cage.

As described above, since fitting between the pin 2 and the pin-receiving hole 4 is applied as interference fit for about 5 to 40 μm, joining strength between the pin 2 and the annular side plate 3 can be ensured without forming the weld portion for the pin 2 and the annular side plate 3 as in the weld portion shown in FIG. 49. Thus, since occurrence of stress concentration to the weld portion for the pin 2 and the annular side plate 3 can be suppressed, this can prevent occurrence of cracking or the like to the weld portion for the pin 2 and the annular side plate 3.

Further, since the cracking or the like to the weld portion caused by stress concentration can be prevented without forming the weld portion for the pin 2 and the annular side plate 3 as in the weld portion (weld portion covering the entire end face of the pin) 6 shown in FIG. 49, lowering of stress by welding can be prevented. Further, TIG welding can be used for the welding for the pin 2 and the annular side plate 3, and this can decrease the residual tensile stress caused by welding. While welding for the pin and the annular side plate is preferably TIG welding or plasma welding, the current value can be lowered during welding also by MAG welding or the like and the residual stress can be decreased by controlling the gas flow rate during welding.

Then, a second embodiment of the present invention is to be described with reference to FIG. 3 and FIG. 4.

Figure 3:
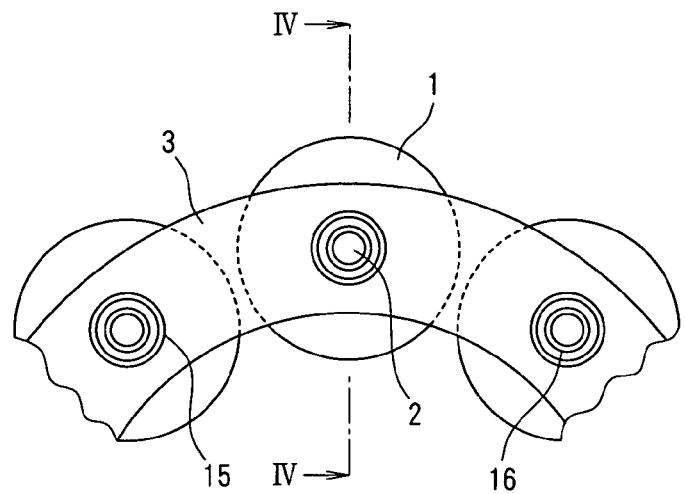
FIG. 3 is a side elevational view showing a portion of a cage for use in a roller bearing according to a second embodiment of the present invention.
Figure 4:
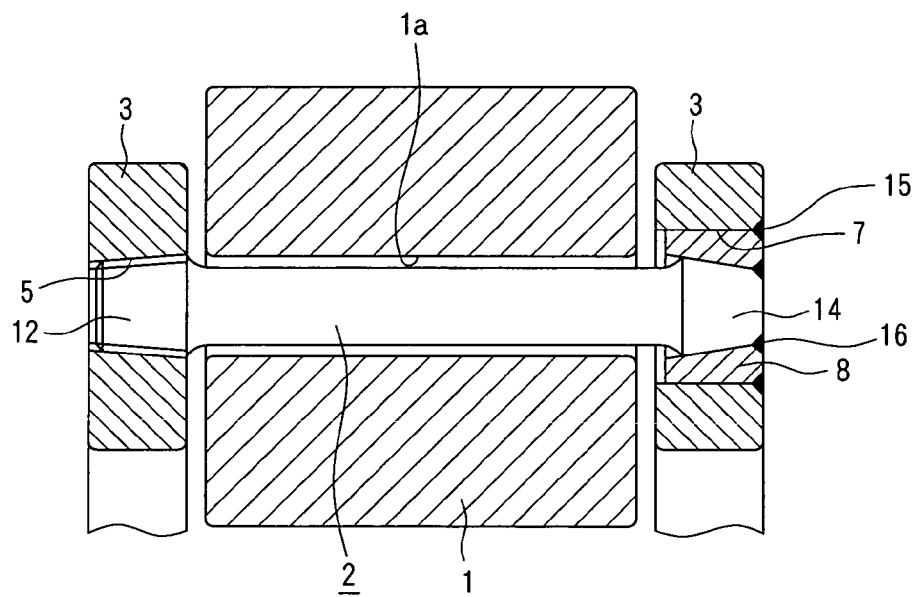
FIG. 4 is IV-IV cross sectional view of FIG. 3.

A cage for use in a rolling bearing according to the second embodiment of the invention comprises, as shown in FIG. 3 and FIG. 4, a plurality of pins 2 for rotatably supporting rolling elements 1 of a cylindrical roller bearing, a pair of annular side plates 3, 3 for retaining the rolling elements 1, by way of the pins 2, each at an equal distance in a circumferential direction of a bearing ring not illustrated, and a plurality of bushes 8 each having, at a central portion, a tapered hole for fitting a tapered portion 14 tapered toward the top end formed to one end of the pin 2, in which the annular plate 3 on the right in FIG. 4 is formed with a plurality of fitting holes 7 for fitting the bushes 8. The fitting holes 7 are formed each at a predetermined distance in the circumferential direction of the annular side plate 3, and fitting between the bush 8 and the fitting hole 7 is applied as interference fit for 5 μm or more and 40 μm or less. The annular side plate 3 on the left in FIG. 4 is formed with a plurality of threaded holes 5 in thread engagement, with tapered threaded portions 12 formed at one end of the pin 2 each at a predetermined distance in the circumferential direction of the annular side plate 3.

The bush 8 is welded to the annular side plate 3 and a weld portion 15 with the bush 8 is formed in a ring shape substantially at a constant welding width to the outer lateral surface of the annular side plate 3 having the fitting hole 7. Further, the pin 2 is welded to the bush 8, and a weld portion 16 with the pin 2 is formed in a ring-shape substantially at a constant welding width to the outer end face of the bush 8.

Figure 50:
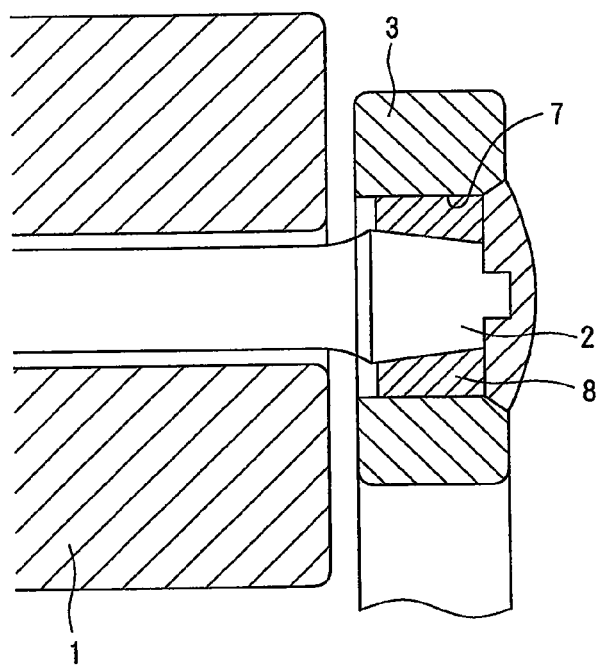
FIG. 50 is a view showing another example of an existent pin-type cage.

As described above, since fitting between the fitting hole 7 formed in the annular side plate 3 and the bush 8 is applied as an interference fit for 5 µm or more and 40 µm or less, joining strength between the annular side plate 3 and the bush 8 can be ensured without forming the weld portion 15 between the annular side plate 3 and the bush 8 as is the weld portion shown in FIG. 50, and occurrence of stress concentration to the weld portion for the annular side plate 3 and the bush 9 can be suppressed.

Further, since the cracking or the like to the weld portion caused by stress concentration can be prevented without forming the weld portion for the annular side plate 3 and the bush 8 and for the bush 8 and the pin 2 as in the weld portion shown in FIG. 5D, lowering of the stress caused by welding can be prevented. Further, the weld portion for the pin 2 and the annular side plate 3 can be formed by TIG welding (possibly also by plasma welding or the like), and this can decrease the residual tensile stress caused by welding.

Then, a third embodiment of the present invention is to be described with reference to FIG. 5 to FIG. 10.

Figure 5:
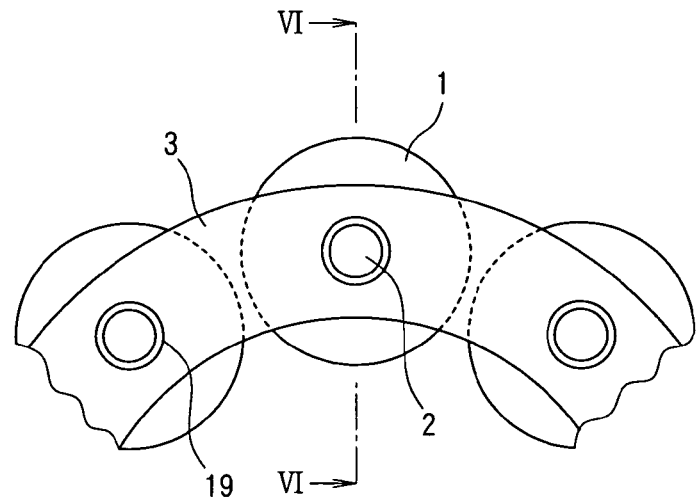
FIG. 5 is a side elevational view showing a portion of a cage for use in a roller bearing according to a third embodiment of the present invention.
Figure 6:
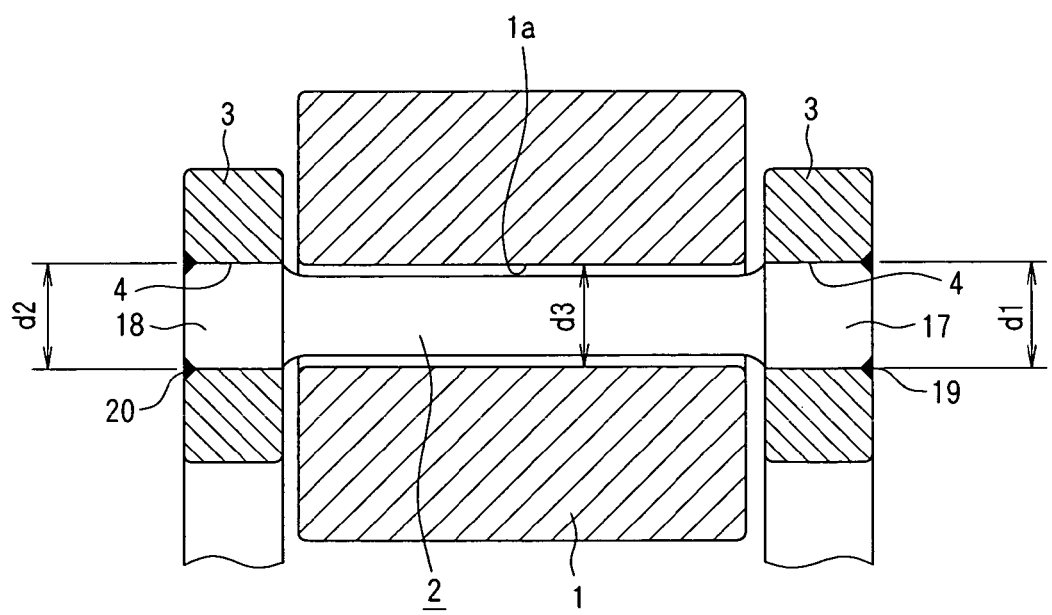
FIG. 6 is VI-VI cross sectional view of FIG. 5.

A cage for use in a roller bearing according to a third embodiment of the present invention comprises, as shown in FIG. 5 and FIG. 6, a plurality of pins 2 for rotatably supporting rolling elements 1 of a cylindrical roller bearing and a pair of annular side plates 3, 3 for retaining the rolling elements 1 by way of the pins each at an equal-distance in the circumferential direction of a bearing ring not illustrated. In each of the annular side plates 3, a plurality of pin-receiving holes 4 that are fitted with fitting portion 17, 18 formed on both ends of the pins 2 by interference fit for 5 µm to 40 µm respectively are perforated. The pin-receiving holes 4 are perforated each at a predetermined distance in the circumferential direction of the annular side plate 3, and the surface for each of a pin-receiving holes 4 is finished by lathing to a roughness of 1.2 µm Ra or less. The surface of the pin-receiving hole 4 may also be fabricated being finished by girding or like other method in the same manner as for the end of the pin 2.

Then, assuming the outer diameter of the fitting portion 17 formed to one end of the pin 2 as $d_1$, and an outer diameter of the fitting portion 18 formed to the other end of the pin 2 as $d_2$, the outer diameter for the fitting portion 17, 18 are is defined as: $d_1 > d_2$. Further, assuming the outer diameter of the pin 2 as $d_3$, the outer diameter for the fitting portion 17, 18 is defined as: $d_3 > d_1 > d_2$.

Figure 8:
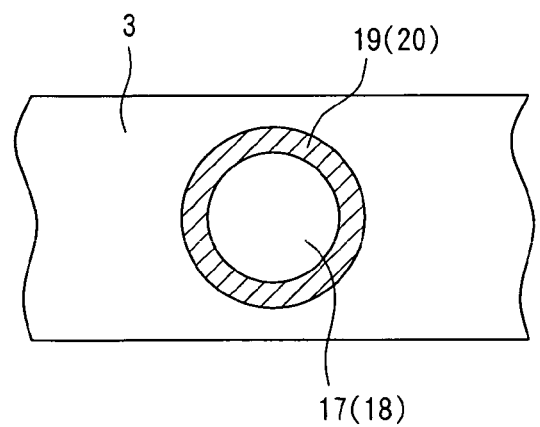
FIG. 8 is a plane view for a weld portion shown in FIG. 7.

The fitting portions 17, 18 are formed each into a cylindrical shape and the outer circumferential surface of the fitting portion 17, 18 forming the ends of the pin is finished by grinding. Further, the fitting portions 17 and 18 are welded respectively to the annular side plate 3, and weld portions 19, 20 with the fitting portions 17, 18 are formed each in a ring-shape substantially at a constant welding width to the outer lateral surface of the annular side plate 3 as shown in FIG. 8.

In this case, the weld portions 19, 20 for the fitting portions 17, 18 and the annular side plate 3 are formed by TIG welding or plasma welding for the pins 2 and the annular side plate 3 in which the extension amount of the weld portions 19, 20 relative to the outer lateral surface of the annular side plate 3 is 0.5 mm or less.

Figure 7:
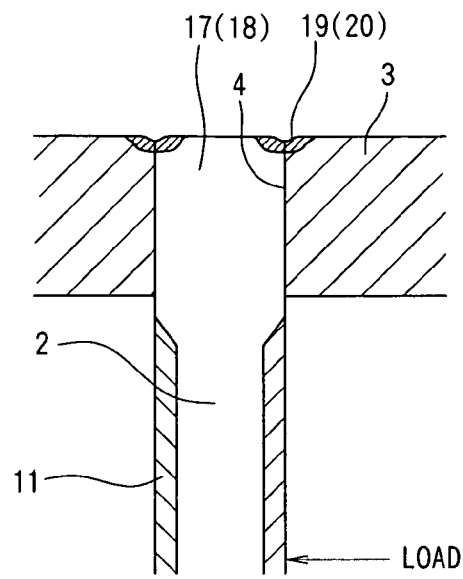
FIG. 7 is a view showing a fitted portion between a pin and a pin-receiving hole.

The pin 2 is formed of an iron and steel material such as SNCM431, S35C, S38C, etc. and a carburized hardening layer 11 as a surface hardening layer is formed to the surface for each of the pins 2 as shown in FIG. 7. A pin insertion hole 1a is formed to the central portion of the rolling element 1 for passing through the pin 2.

Like in the third embodiment described above, since fitting between the fitting portions 17, 18 formed to both ends of the pin 2 and the pin-receiving hole 4 formed in the annular side plate 3 is applied as interference fit for about 5 µm to 40 µm, joining strength between the pin 2 and the annular side plate 3 can be ensured without forming the weld portions 19, 20 for the pin 2 and the annular side plate 3 as in the weld portion shown in FIG. 49. Accordingly, even when a load in the rotational direction (circumferential direction) exerts on the pin, occurrence of stress concentration to the weld portion for the pin and the annular side plate can be suppressed.

Further, since the cracking or the like to the weld portion caused by stress concentration can be prevented without forming the weld portions 19, 20 for the fitting portions 17, 18 and the annular side plate 3 as in the weld portion (weld portion covering the entire end face of the pin) 6 shown in FIG. 49, lowering of stress caused by welding can be prevented. Further, TIG welding can be used for the welding for the pin 2 and the annular side plate 3, and this can decrease the residual tensile stress caused by welding. While welding for the pin and the annular side plate is preferably TIG welding or plasma welding, the current value can be lowered during welding also by MAG welding or the like and the residual stress can be decreased by controlling the gas flow rate during welding.

Figure 9:
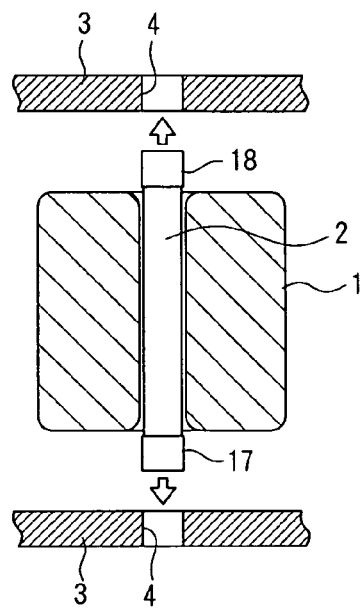
FIG. 9 is a view showing an example of a fitting method of a pin in a case where the hole diameter for each pin-receiving hole perforated in left and right annular side plates is of an identical hole diameter.
Figure 10:
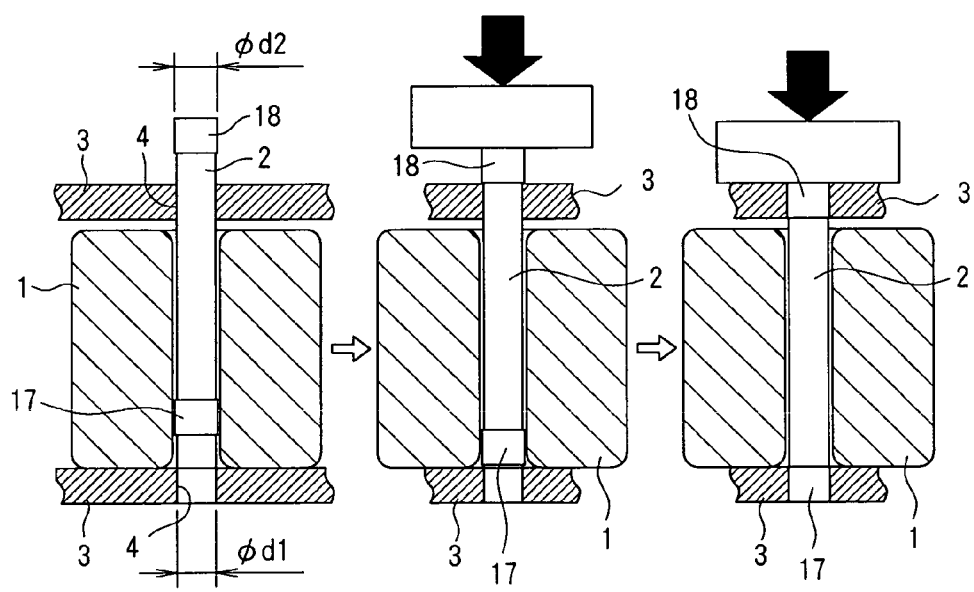
FIG. 10 is an explanatory view for explaining the function and the effect of the cage for use in the roller bearing according to the third embodiment of the present invention.

Further, in the embodiment described above, the cage can be assembled easily by defining the outer diameters $d_1$, $d_2$ of the fitting portions 17, 18 as $d_1 > d_2$, preferably, $d_3 > d_1 > d_2$ ($d_3$ :pin outer diameter). That is, in a case where the outer diameter for the fitting portions 17, 18 is made as an identical diameter, fitting directions of the fitting portions 17, 18 to the pin-receiving hole 4 are contrary to each other in the direction as shown in FIG. 9. However, by defining the outer diameters $d_1$, $d_2$ of the fitting portions 17, 18 as: $d_1 > d_2$, since the fitting directions of the fitting portions 17, 18 can be made identical as shown in FIG. 10, the cage can be assembled easily.

Further, in the third embodiment, since the outer circumferential surface of the fitting portions of 17, 18 is finished by grinding, occurrence of scraping can be prevented upon fitting the fitting portions 17, 18 into the pin-receiving holes 4 of the annular side plate 3. Further, since the weld portions 19, 20 for the pins 2 and the annular side plate 3 are formed by TIG welding or plasma welding in the embodiment described above, the extension amount of the weld portions 19, 20 can be suppressed than usual. Furthermore, since the extension amount of the weld portions 19, 20 relative to the outer lateral surface of the annular side plate 3 is made to 0.5 mm or less, the axial length of the rolling element 1 can be ensured to be longer than in the existent case.

Figure 11:
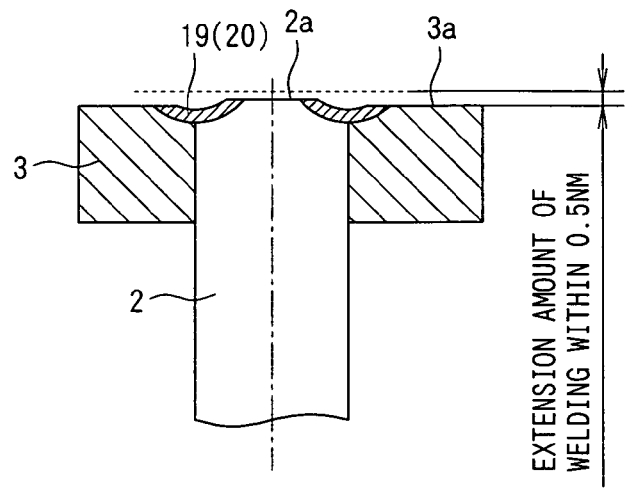
FIG. 11 is a fragmentary cross sectional view of the roller bearing cage shown in FIG. 5.
Figure 12:
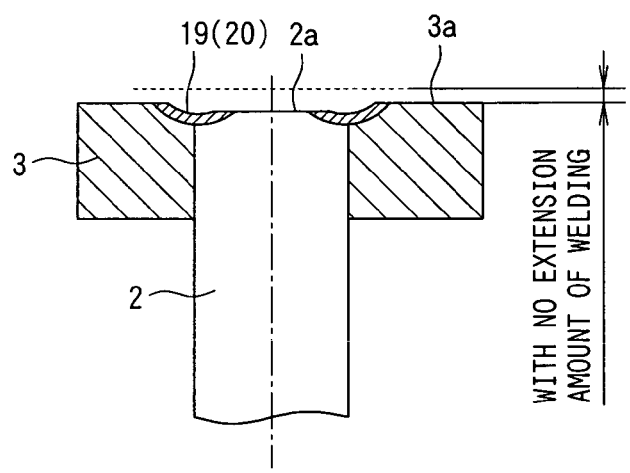
FIG. 12 is a fragmentary cross sectional view of a roller bearing cage according to a fourth embodiment of the present invention.

In the third embodiment described above, while the end face of the pin 2 and the outer lateral surface of the annular plate 3 are formed on one identical plane, the end face 2a of the pin 2 may be protruded from the outer lateral surface 3a of the annular plate 3 within a range of 0.5 mm or less as shown in FIG. 11. Alternatively, as shown in FIG. 12, the outer lateral surface 3a of the annular plate 3 may be protruded relative to the end face 2a of the pin 2 within a range of 0.5 mm or less.

Figure 13A:
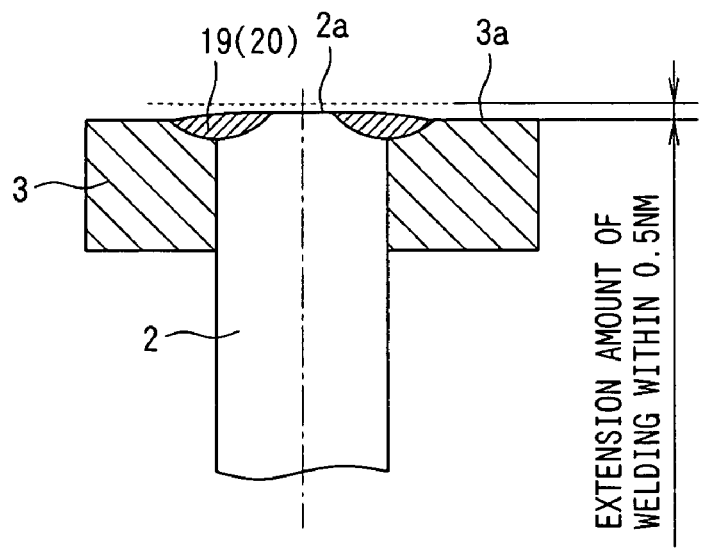
FIG. 13 is a view showing a weld portion in a case of welding a pin and an annular side plate by using a welding wire.
Figure 13B:
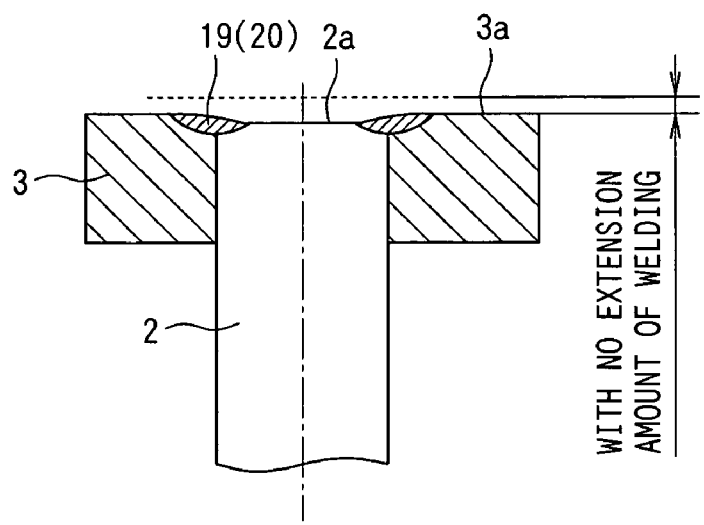

Further, in the third embodiment, while the weld portions 19, 20 for the pin 2 and the annular side plate 3 are formed by method of directly welding base materials to each other without using a welding wire, the weld portions 19, 20 for the pin 2 and the annular side plate 3 may be formed also by using a welding wire as shown in FIG. 13.

Then, a fourth embodiment of the present invention is to be described with reference to FIG. 14 to FIG. 19.

Figure 14:
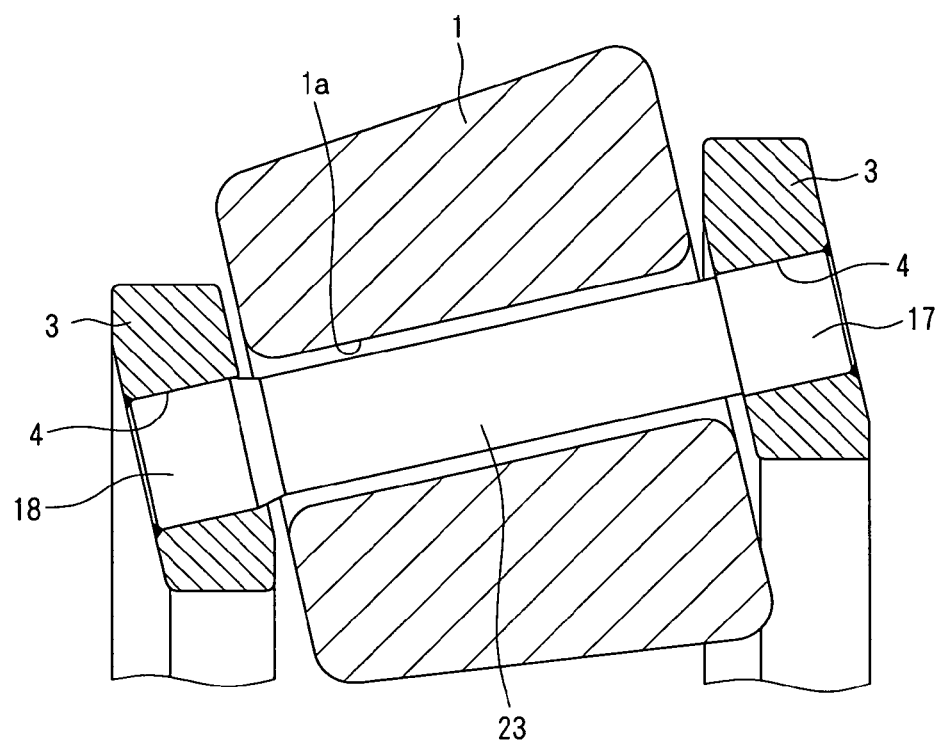
FIG. 14 is a fragmentary cross sectional view of a roller bearing cage according to a fifth embodiment of the present invention.

A cage for use in a roller bearing according to the fourth embodiment of the present invention comprises, as shown in FIG. 14, a plurality of pins 2 for rotatably supporting rolling elements 1 of a cylindrical roller bearing and a pair of annular side plates 3, 3 for retaining the rolling elements 1 by way of the pins each at an equal-distance in the circumferential direction of a bearing ring not illustrated. In each of the annular side plates 3, a plurality of pin-receiving holes 4 that are fitted with cylindrical fitting portions 17, 18 formed on both ends of the pin 2 by interference fit for 5 μm to 40 μm are perforated. The pin-receiving holes 4 are perforated to the annular side plate 3 each at a predetermined distance in the circumferential direction of the annular side plate 3, and the surface for each of the pin-receiving holes 4 is finished by lathing to a roughness of 1.2 μm Ra or less.

Then, assuming the outer diameter of the fitting portion 17 formed to one end of the pin 2 as $d_1$, and an outer diameter of the fitting portion 18 formed to the other end of the pin 2 as $d_2$, the outer diameters for the fitting portions 17, 18 are defined as: $d_1 > d_2$. Further, assuming the outer diameter of the pin 2 as $d_3$, the outer diameters for the fitting portions 17, 18 are defined as: $d_3 > d_1 > d_2$.

The fitting portions 17, 18 are welded respectively to the annular side plate 3, and weld portions for the fitting portions 17, 18 and the annular side plate 3 are formed in a ring shape substantially at a constant welding width to the outer lateral surface of the annular plate 3.

Figure 15:
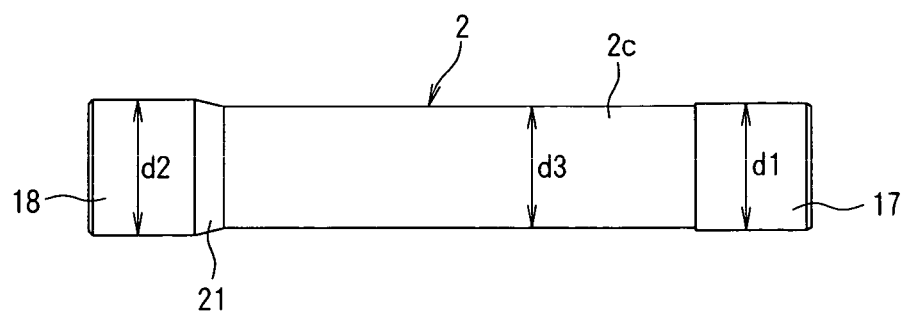
FIG. 15 is a side elevational view of a pin shown in FIG. 14.

The pin, as shown in FIG. 15, has a shaft portion 2c between the fitting portion 17 and the fitting portion 18. The shaft portion 2c is formed into a smaller diameter than the rear end (fitting portion 18) of the pin 2, and a tapered portion 21 (referrer to FIG. 17) is formed between the rear end (fitting portion 18) and the shaft portion 2c of the pin 2 at an angle of inclination $\theta_2$ of 30° or less relative to the circumferential surface of the pin 2.

Figure 16:
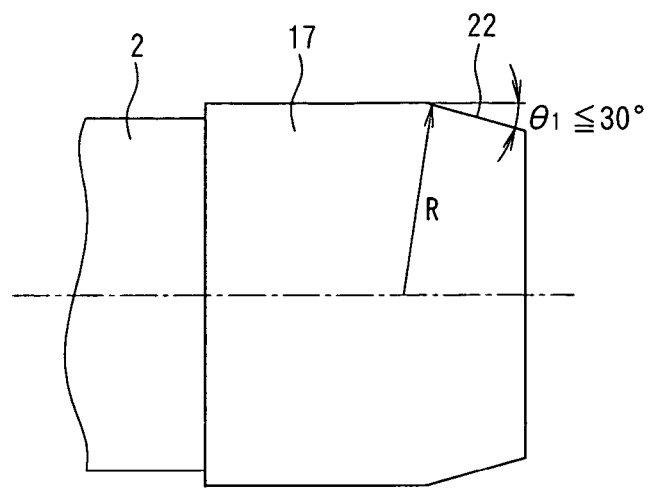
FIG. 16 is a view showing a top end of a pin.
Figure 17:
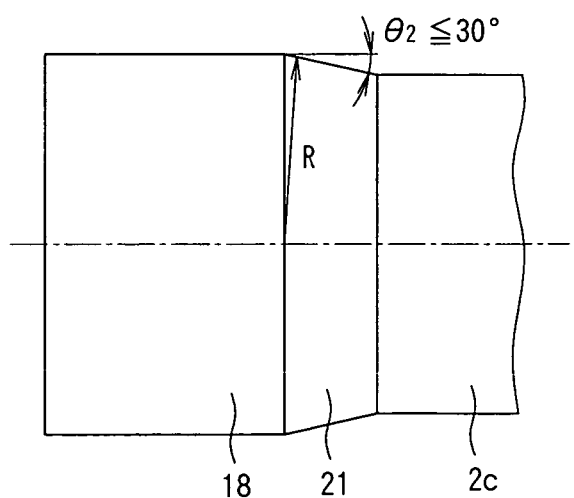
FIG. 17 is a view showing a rear end of a pin.
Figure 18:
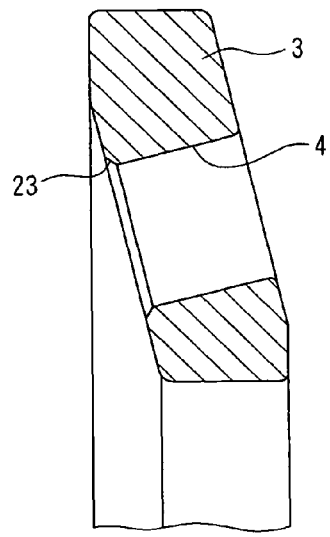
FIG. 18 is a fragmentary cross sectional view of a annular side plate on the side where the top end of the pin is fitted.
Figure 19:
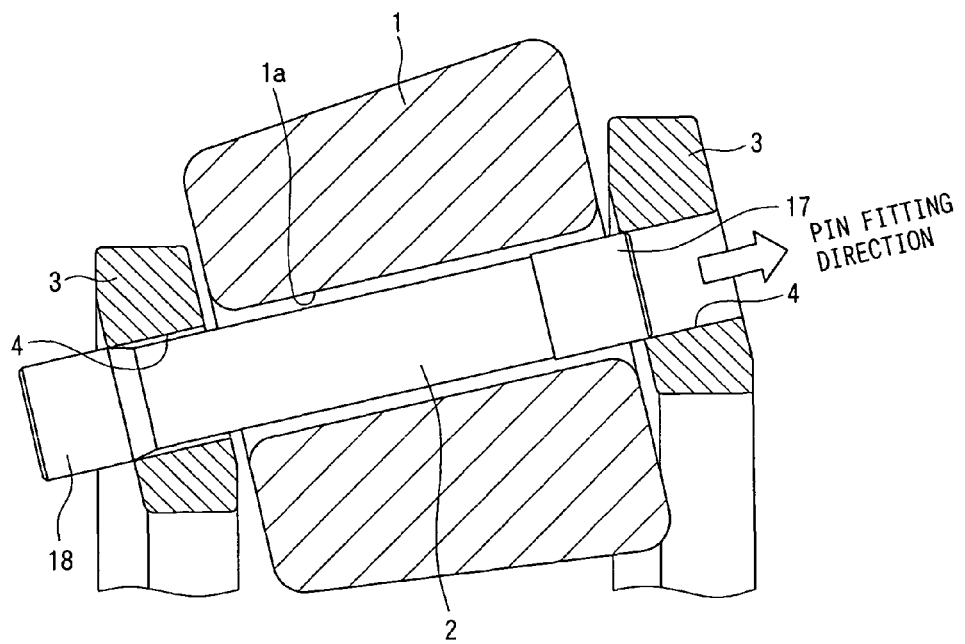
FIG. 19 is a view for explaining the fitting direction of a pin in a case of assembling the cage shown in FIG. 14.

The top end of the pin 2 (fitting portion 17) is formed to a larger diameter than the shaft portion 2c and a chamfered portion 22 (refer to FIG. 16) is formed at the top end face of the pin 2 at an angle of inclination $\theta_1$ of 30° or less relative to the circumferential surface of the pin 2. A chamfered portion 23 (refer to FIG. 18) is formed to the pin-receiving hole 4 in which the top end of the pin 2 is fitted for reducing the frictional resistance with the pin 2. Further, the boundary between the chamfered portion 23 formed to the top end face of the pin 2 and the top end of the pin 2 is chamfered in an arcuate shape with a radius of curvature of R along the axial direction of the pin 2 as shown in FIG. 16, and the boundary between the rear end of the pin 2 and the tapered portion 21 is chamfered in an arcuate shape at a radius of curvature of R along the axial direction of the pin 2.

In the fourth embodiment constituted as described above, since fitting between the fitting portions 17, 18 formed on both ends of the pin 2 and the pin-receiving holes 4 formed in the annular side plate 3 is applied as interference fit for about 5 μm to 40 μm, joining strength between the pin 2 and the annular side plate 3 can be ensured without forming the weld portion for the pin 2 and the annular side plate 3 as in the weld portion shown in FIG. 4. Accordingly, even when a load in the rotational direction (circumferential direction) exerts on the pin, occurrence of stress concentration to the weld portion for the pin and the annular side plate can be suppressed.

Further, in the forth embodiment described above, since the outer diameters $d_1$, $d_2$ for the fitting portions 17, 18 are defined as: $d_1 > d_2$, preferably, $d_3 > d_1 > d_2$ ($d_3$; outer diameter of pin), the cage can be assembled easily like the third embodiment. Further, since the chamfered portion 22 having an angle of inclination of 30° or less relative to the circumferential surface of the pin 2 is disposed to the top end face of the pin 2, the top end of the pin 2 can be easily fitted to the pin-receiving hole 4 of the annular side plate 3, and the cage can be assembled easily. Further, since the boundary between the chamfered portion 22 formed to the top end face of the pin 2 and the top end of the pin 2 is chamfered in an arcuate shape with a radius of curvature of R along the axial direction of the pin 2, occurrence of burrs, etc. can be prevented upon fitting the top end of the pin 2 into the pin-receiving hole 4 of the annular side plate 3.

Further, in the fourth embodiment, since the rear end of the pin 2 can be fitted easily into the pin-receiving hole 4 of the annular side plate 3 by disposing the tapered portion 21 having the angle of inclination of 30° or less relative to the circumferential surface of the pin 2 between the rear end (fitting portion 18) and the shaft portion 2c of the pin 2, the cage can be assembled easily. Further, since the boundary between the rear end and the tapered portion 21 of the pin 2 is chamfered in an arcuate shape at a radius of curvature of R along the axial direction of the pin 2, occurrence of burrs, etc. can be prevented upon fitting the rear end of the pin 2 into the pin-receiving hole 4 of the annular side plate. Further, since the surface roughness of the pin-receiving hole 4 is decreased to 1.2 μm Ra or less, occurrence of burrs, etc. can be prevented upon fitting the both ends of the pin 2 into the pin-receiving holes 4.

Figure 20:
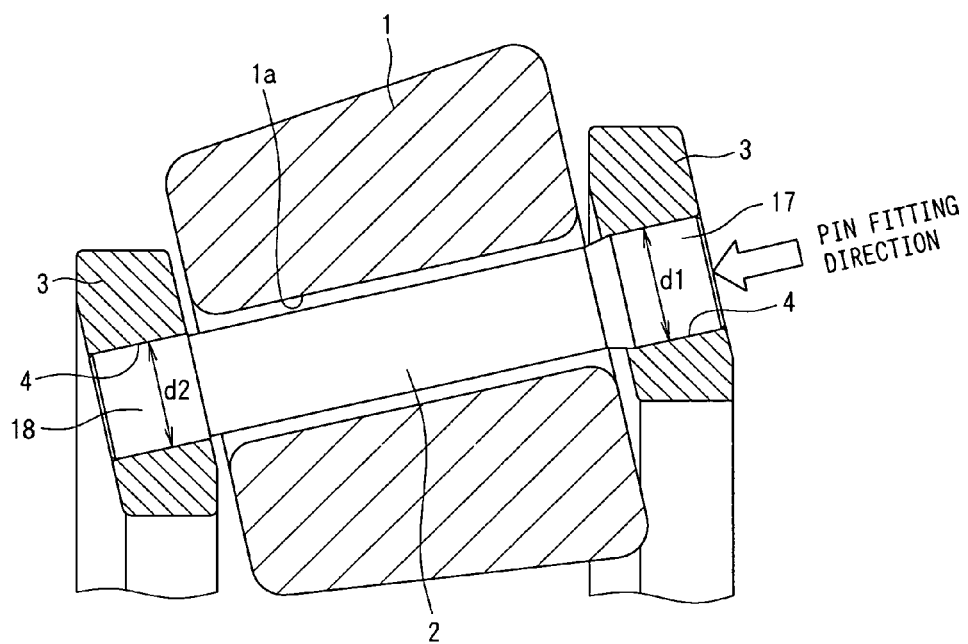
FIG. 20 is a fragmentary cross sectional view of a roller bearing cage according to a sixth embodiment of the present invention.

In the fourth embodiment described above, while the outer diameter $d_1$ of the fitting portion 17 formed at one end of the pin 2 and the outer diameter $d_2$ of the fitting portion 18 formed at the other end of the pin 2 are defined as: $d_1 > d_2$, the outer diameter $d_1$ of the fitting portion 17 formed at one end of the pin 2 and the outer diameter $d_2$ of the fitting portion 18 formed at the other end of the pin 2 may also be defined as: $d_1 > d_2$ like in a fifth embodiment shown in FIG. 20. However, the direction of fitting the pin 2 is in the direction opposite to that in the fourth embodiment.

Then, a sixth embodiment of the present invention is to be described with reference to FIG. 21 to FIG. 26.

Figure 21:
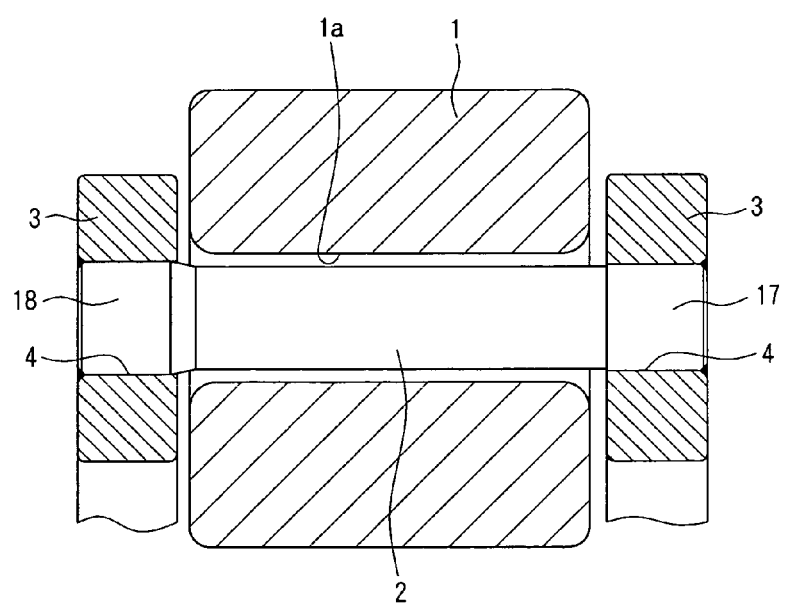
FIG. 21 is a fragmentary cross sectional view of a roller bearing cage according to a seventh embodiment of the present invention.

A cage for use in a roller bearing according to a sixth embodiment of the present invention comprises, as shown in FIG. 21, a plurality of pins 2 for rotatably supporting rolling elements 1 of a cylindrical roller bearing and a pair of annular side plates 3, 3 for retaining the rolling elements 1 by way of the pins each at an equal-distance in the circumferential direction of a bearing ring not illustrated. In each of the annular side plates 3, a plurality of pin-receiving holes 4 that to be fitted with cylindrical fitting portions 17, 18 formed on both ends of the pin 2 by interference fit for 5 μm to 40 μm are perforated.

Then, assuming the outer diameter of the fitting portion 17 formed to one end of the pin 2 as $d_1$, and an outer diameter of the fitting portion 18 formed to the other end of the pin 2 as $d_2$, the outer diameters for the fitting portions 17, 18 are defined as: $d_1 > d_2$. Further, assuming the outer diameter of the pin 2 as $d_3$, the outer diameters for the fitting portions 17, 18 are defined as: $d_3 > d_1 > d_2$.

The fitting portions 17, 18 are welded respectively to the annular side plate 3, and weld portions for the fitting portions 17, 18 and the annular side plate 3 are formed in a ring shape substantially at a constant welding width to the outer lateral surface of the annular plate 3.

The pin-receiving holes 4 are perforated to the annular side plate 3 each at a predetermined distance in the circumferential direction of the annular side plate 3 and the surface of each of the pin-receiving holes 4 is finished by lathing to a roughness of 1.2 μm Ra or less.

Figure 26:
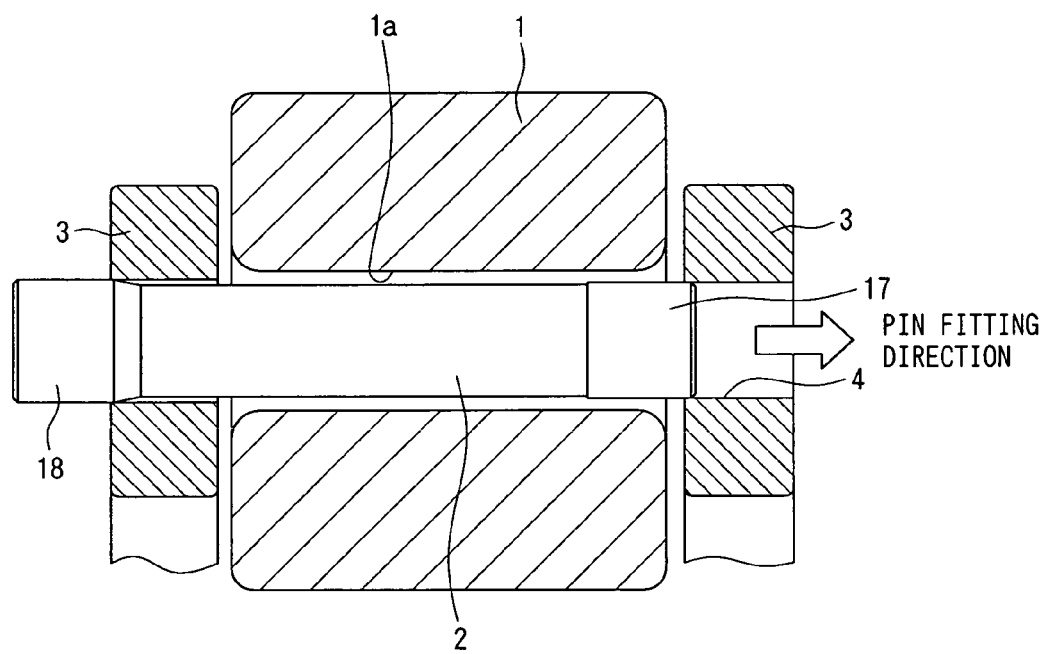
FIG. 26 is a view for explaining the fitting direction of the pin in a case of assembling the cage shown in FIG. 21.

The direction of fitting the pin 2 into the annular side plate 3 is shown in FIG. 26. As shown in the drawing, the cage for use in the roller bearing according to the sixth embodiment is assembled by fitting the pin 2 into the pin-receiving hole 4 formed in the annular side plate 3 in the direction of an arrow in the drawing, and a chamfered portion 22 (refer to FIG. 23) is formed at an angle of inclination of $\theta_1$ of 30° or less relative to the circumferential surface of the pin 2 at the top end face of the pin 2 to be fitting into the pin-receiving hole 4.

Figure 22:
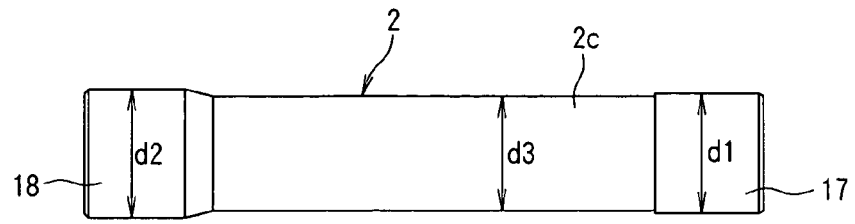
FIG. 22 is a side elevational view of a pin shown in FIG. 21.

As shown in FIG. 22, the pin 2 has a shaft portion 2c between the fitting portion 17 and the fitting portion 18. The shaft portion 2c is formed to a smaller diameter than the rear end (fitting portion 18) of the pin 2, and a tapered portion 21 (refer to FIG. 24) is formed between the rear end (fitting portion 18) and the shaft portion 2c of the pin 2 at an angle of inclination $\theta_2$ of 30° or less relative to the circumferential surface of the pin 2.

Figure 23:
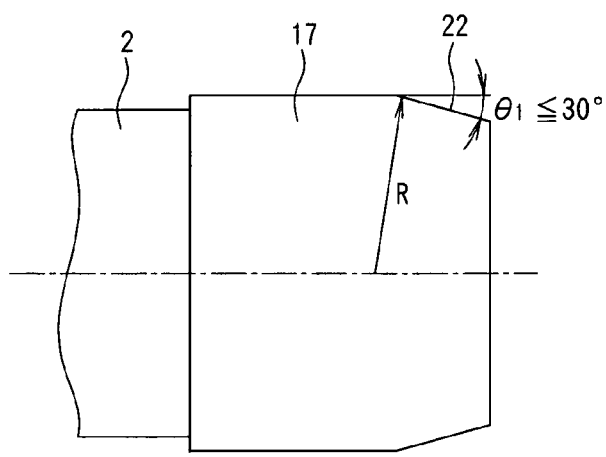
FIG. 23 is a view showing the top end of the pin.
Figure 24:
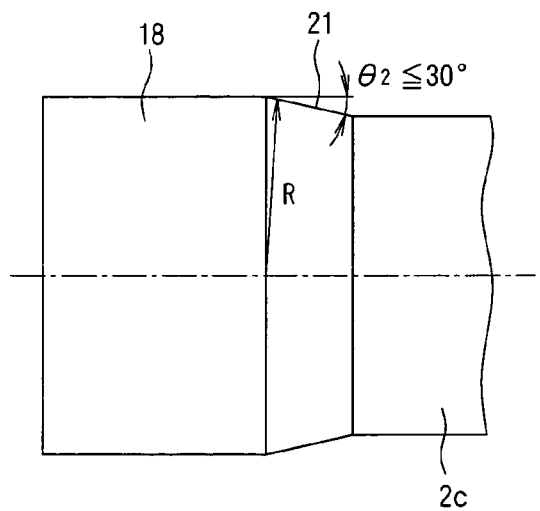
FIG. 24 is a view showing the rear end of the pin.
Figure 25:
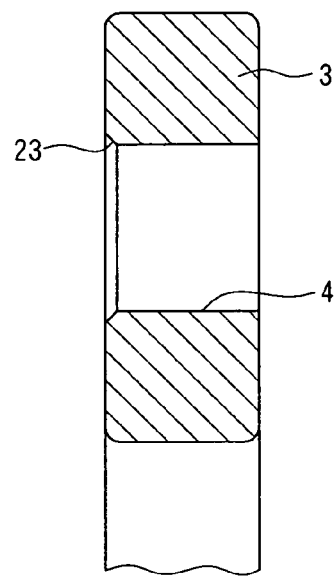
FIG. 25 is a fragmentary cross sectional view of a annular side plate on the side where the top end of the pin is fitted.

The boundary between the chamfered portion 22 formed at the top end face of the pin 2 and the top end of the pin 2 is chamfered as shown in FIG. 23 in an arcuate shape at a radius of curvature of R along the axial direction of the pin 2. Further, the boundary between the rear end and the tapered portion 21 of the pin 2 is chamfered, as shown in FIG. 24, into an arcuate shape at the radius of curvature of R along the axial direction of the pin 2. A chamfered portion 23 (referred to 25) is formed to the pin-receiving hole 4 into which the top end of the pin 2 is fitted in order to reduce the frictional resistance with the pin 2.

annular side plate 3 by forming the tapered portion 21 having the angle of inclination of 30° or less relative to the circumferential surface of the pin 2 between the rear end (fitting portion 19) and the shaft portion 2c of the pin 2, the cage can be assembled easily. Further, since the boundary between the rear end and the tapered portion 21 of the pin 2 is chamfered in the arcuate shape at the radius of curvature of R along the axial direction of the pin 2, occurrence of burrs, etc. can be prevented upon fitting the rear end of the pin 2 into the pin-receiving hole 4 of the annular side plate. Further, since the surface roughness of the pin-receiving hole 4 is decreased to 1.2 µm Ra or less, occurrence of burrs, etc. can be prevented upon fitting the both ends of the pin 2 into the pin-receiving holes 4.

Further, occurrence of burrs can be prevented upon fitting the both ends of the pin 2 into the pin-receiving hole 4 by decreasing the surface roughness of the pin-receiving hole of to 1.2 µm Ra or less.

Figure 27:
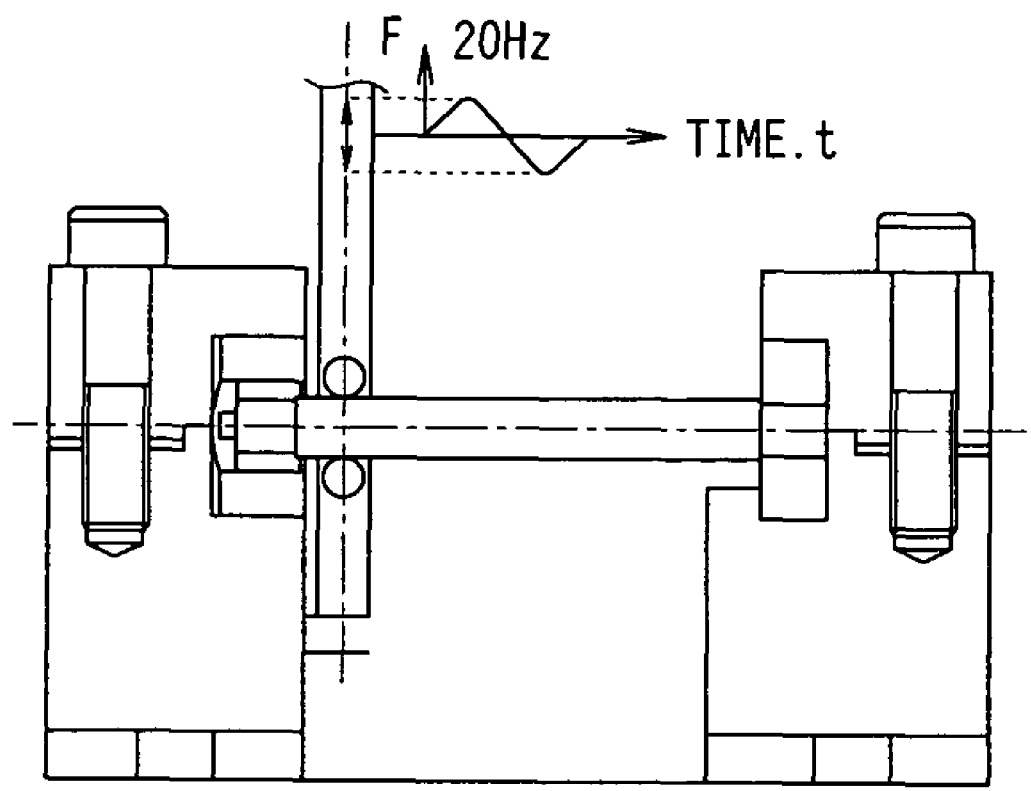
FIG. 27 is a view showing a test apparatus used for a fatigue strength test of a pin-type cage.

The present inventors conducted a fatigue strength test for the pin-type cage by using test samples of the specification shown in Table 1 in order to confirm the effect of the cage for use in the roller bearing according to the present invention. Specifically, each of the test samples in Table 1 was set to a test apparatus shown in FIG. 27 (Servo Pulser EH-15 manufactured by Simazu Seisakusho) and a both-direction test at 20 Hz was conducted under a predetermined test load (stress).

TABLE 1

|  | Comparative Example 1 | Comparative Example 2 | Example 1 | Example 2 | Example 3 |
| --- | --- | --- | --- | --- | --- |
| Pin structure | 2-stage pin | Tapered bush | Straight | Straight | Tapered bush |
| Gap | 0.1 to 0.2 mm | 0 mm | — | — | — |
| Interference | — | — | 0 to 5 µm | 13 to 18 µm | Control for driving amount |
| Welding range | Buried in side plate hole | Buried in side plate hole | Only on circumference | Only on circumference | On two circumferences |

In the sixth embodiment constituted as described above, since the outer diameters $d_1$, $d_2$ of the fitting portions 17, 18 are defined as: $d_1 > d_2$, preferably, $d_3 > d_1 > d_2$ ($d_3$: outer diameter of pin), the cage can be assembled easily like the third to sixth embodiments. Further, since the top end of the pin 2 can be fitted easily into the pin-receiving hole 4 of the annular side plate 3 by forming the chamfered portion 22 having the angle of inclination of 30° or less relative to the circumferential surface of the pin 2 to the top end face of the pin 2, the cage can be assembled easily. Further, since the boundary between the chamfered portion 22 formed to the top end face of the pin 2 and the top end of the pin 2 is chamfered into an arcuate shape at a radius of curvature of R along the axial direction of the pin 2, occurrence of burrs, etc. can be prevented upon fitting the top end of the pin 2 into the pin-receiving hole 4 of the annular side plate 3.

Figure 28:
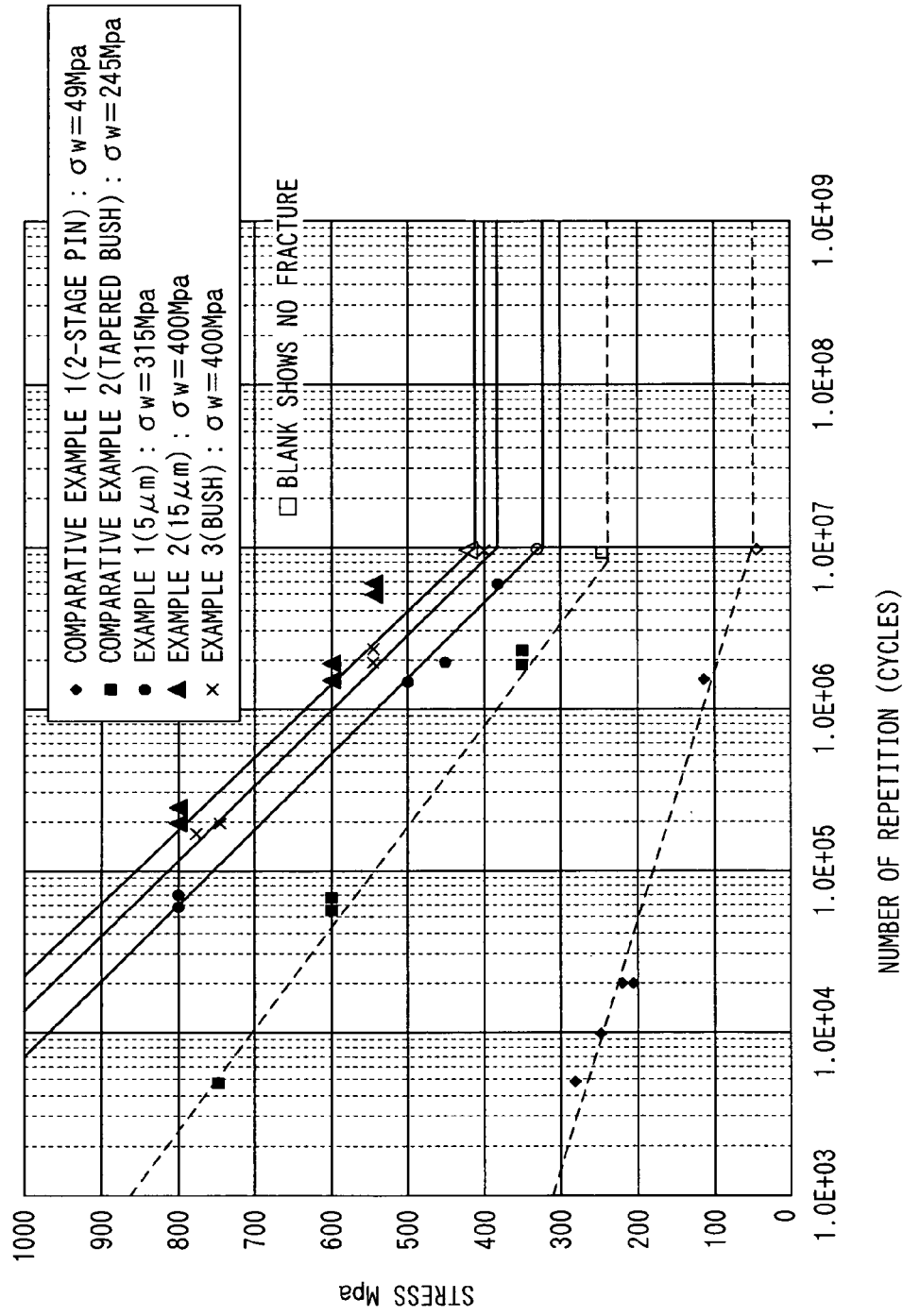
FIG. 28 is a graph showing the result of the fatigue strength test of the pin-type cage.
Figure 29:
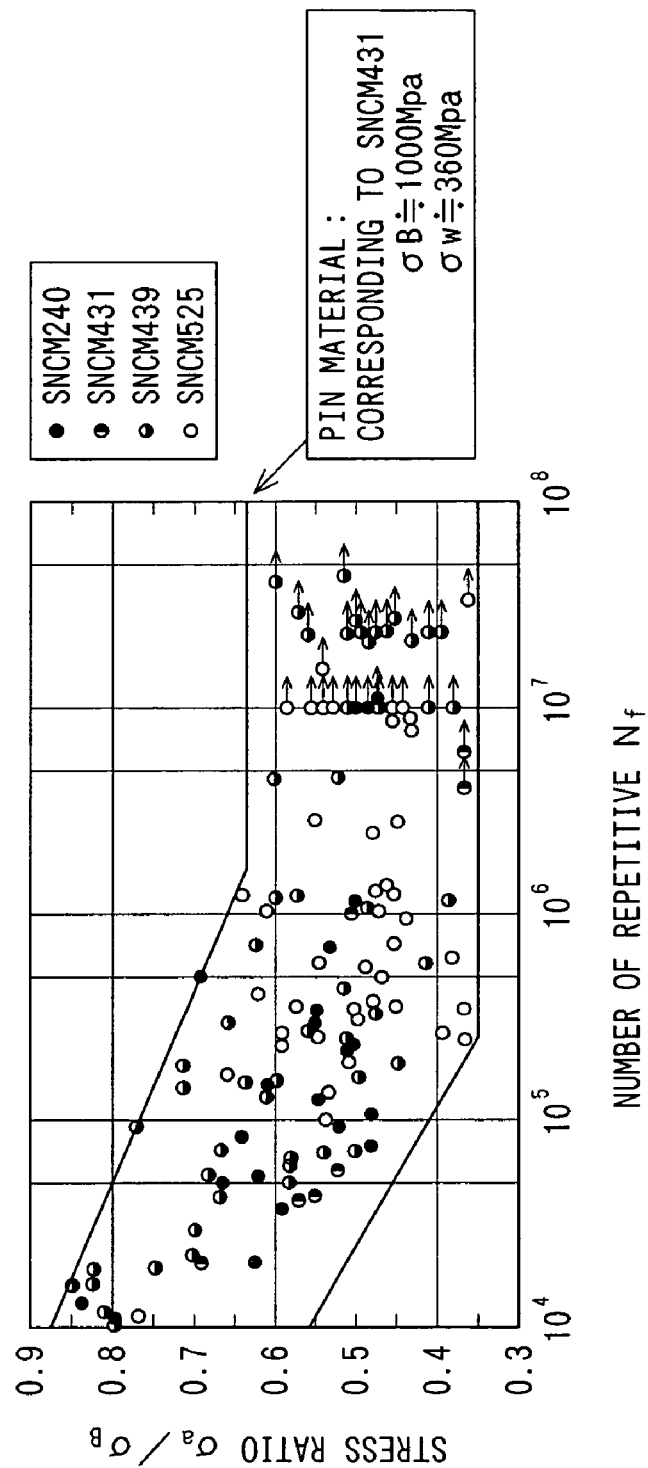
FIG. 29 is a graph showing bending curves of structural alloy steels under rotation.

Further, in the sixth embodiment, since the rear end of the pin 2 can be fitted easily into the pin-receiving hole 4 of the FIG. 28 shows the test result of the fatigue strength test described above. From the test result in the figure, it was confirmed that Examples 1 to 3 of the present invention were improved in the fatigue strength compared with Comparative Example 1 and Comparative Example 2 and it reached as far as the fatigue strength of the base material for the pin shown in FIG. 29. Since fretting, etc. are liable to occur to the fitting portion between the pin 2 and the pin-receiving hole 4 in a case of setting the lower limit value for the interference of the pin-receiving hole 4 to the pin 2 to less than 5 µm, the lower limit value for the interference was set to 5 µm. Further, since an excess fitting force was required and scraping occurred upon fitting the pin 2 into the pin-receiving hole 4 as shown in Table 2 when setting the upper limit value for the interference of the pin-receiving hole 4 to the pin 2 to 41 µm or more, and scraping or burrs occurred at an interference of 40 µm or more, the upper limit value for the interference was set to 40 µm.

TABLE 2

Surface pressure by fitting and example of calculation for fitting force $$\text{Average surface pressure: pm} = \frac{E}{2} \frac{\Delta d}{d} \frac{(1-k^2)(1-k_o^2)}{1-k^2 k_o^2}$$

Fitting force: $F = \mu \cdot pm \cdot \pi \cdot d \cdot B$
$\mu = 0.12$

| | Calculation Example 1 | Calculation Example 2 | Calculation Example 3 | Calculation Example 4 | Calculation Example 5 | Calculation Example 6 | Calculation Example 7 |
|---|---|---|---|---|---|---|---|
| d: shaft diameter (mm) | 12.6 | 12.6 | 12.6 | 12.6 | 12.6 | 12.6 | 12.6 |
| B: width (mm) | 16 | 16 | 16 | 16 | 16 | 16 | 16 |
| Δd: Effective interference (mm) | 0.005 | 0.01 | 0.015 | 0.02 | 0.025 | 0.030 | 0.040 |
| E: young's modulus | 207760 | 207760 | 207760 | 207760 | 207760 | 207760 | 207760 |
| Side plate width (mm) | 35 | 35 | 35 | 35 | 35 | 35 | 35 |
| k: thickness ratio | 0.36 | 0.36 | 0.36 | 0.36 | 0.36 | 0.36 | 0.36 |
| Ko: pin pore ratio | 0 | 0 | 0 | 0 | 0 | 0 | 0 |
| Pm: average surface pressure (N/mm) | 35.879 | 71.756 | 107.643 | 143.521 | 179.399 | 215.268 | 287.024 |
| μ: friction coefficient | 0.120 | 0.120 | 0.120 | 0.120 | 0.120 | 0.120 | 0.120 |
| F: fitting force (N) upon pin fitting | 2726.92 | 5453.84 | 8180.76 | 10907.66 | 13634.58 | 16361.52 | 21815.36 |
| Number of pins | 27 | 27 | 27 | 27 | 27 | 27 | 27 |
| Total press load (N) upon fitting into side plate | 73627.4 | 147254.8 | 220882.2 | 294509.6 | 368137 | 441761 | 589014 |

Figure 30:
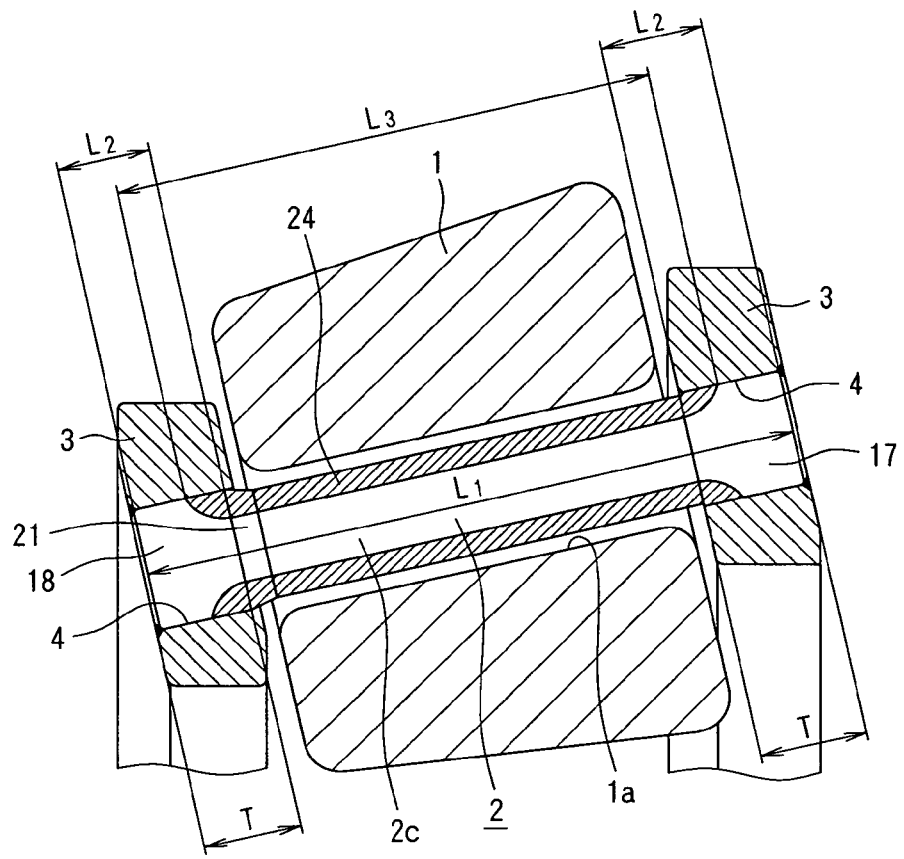
FIG. 30 is a fragmentary cross sectional view of a roller bearing cage according to an eighth embodiment of the present invention.

FIG. 30 shows an embodiment of applying the present invention to a pin-type cage used for a tapered roller bearing. As shown in the drawing, the pin-type cage according to this embodiment comprises a plurality of pins 2 (only one of them is illustrated in the drawings) for rotatably supporting rolling elements 1 of the tapered roller bearing and a pair of annular side plates 3, 3 for retaining the rolling elements 1 each at an equal distance in the circumferential direction of a bearing ring (not illustrated) by way of the pins 2. A plurality of pin-receiving holes 4 are perforated in each of the annular side plates 3 that fit with cylindrical fitting portions 17, 18 formed at both ends of the pins 2 by insert fit for 5 μm to 40 μm.

The pin 2 has a shaft portion 2c that is inserted through a pin insertion hole 1a formed in the central portion of the rolling element 1. The shaft portion 2c is formed to a smaller diameter than the fitting portions 17, 18 formed at both ends of the pin 2, and a tapered portion 21 is formed at an angle of inclination of 30° or less relative to the circumferential surface of the pin 2 between the fitting portion 18 formed at one end of the pin 2 and the shaft portion 2c.

Further, pin 2 is formed of an iron and steel material such as SNCM431, S35C, and S38C, and a RF quenched layer 24 is formed as a surface hardening layer to the circumferential surface of each pin. The RF quenched layer 24 is formed to the circumferential surface of the pin 2 so as to satisfy the relation: $L_1 > L_3 > L_1 - 2L_2$, preferably, $L_1 - 2T > L_3 > L_1 - 2L_2$ assuming the entire length of the pin 2 as $L_1$, the axial length of the fitting portions 17, 18 as $L_2$, the region forming the RF quenched layer 24 in the axial direction of the pin 2 as $L_3$, and the thickness of the annular side plate 3 as T.

The RF quenched layer 24 is present also on both ends of the pin 2 (fitting portions 17, 18) fitting into the pin-receiving holes 4 of the annular side plates 3 by defining the region $L_3$ forming the RF quenched layer 24 in the axial direction of the pin 2 as: $L_1 > L_3 > L_1 - 2L_2$, preferably, $L_1 - 2T > L_3 > L_1 - 2L_2$. Since this can suppress large wear at the ends of the pin 2 by the rolling element 1 even when the rolling element 1 moves toward the annular side plate and is in contact with the end of the pin 2 during use, the mechanical strength of the pin 2 to the bending stress can be increased.

Figure 31:
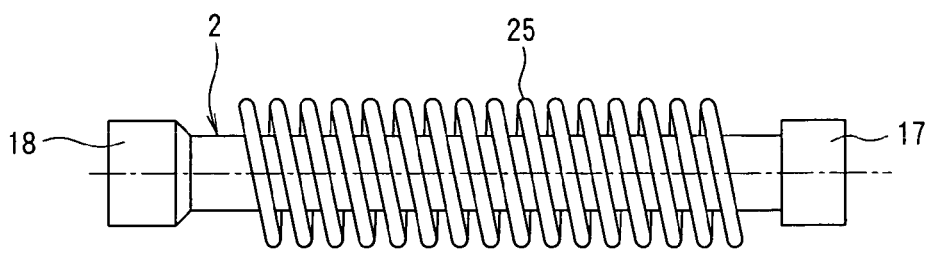
FIG. 31 is a view for explaining a method in a case of forming an RF quenched layer to the circumferential surface of the pin shown in FIG. 30.

FIG. 31 is a view showing an example in a case of forming the RF quenched layer 24 to the circumferential surface of the pin 2. As shown in the drawing, in a case of forming the RF quenched layer 24 to the circumferential surface of the pin 2, an RF current supplied to RF induction heating coils 25 or a relative moving speed of the RF induction heating coils 25 to the pin 2 used when conducting RF quenching to the circumferential surface of the pin 2 is controlled separately for the both ends of the pin 2 (fitting portions 17, 18) and for other portions.

As described above, by controlling the RF current supplied to the RF induction heating coils 25 or the relative moving speed of the RF induction heating coils 25 to the pin 2 separately for both ends of the pin 2 (fitting portions 17, 18) and for other portions when forming the RF quenched layer 24 as the surface hardening layer to the circumferential surface of the pin 2, the RF quenched layer 24 of uniform quenching depth can be formed to the circumferential surface of the pin 2 even in a case where the outer diameter is different between the central portion and both ends of the pin 2.

Figure 32:
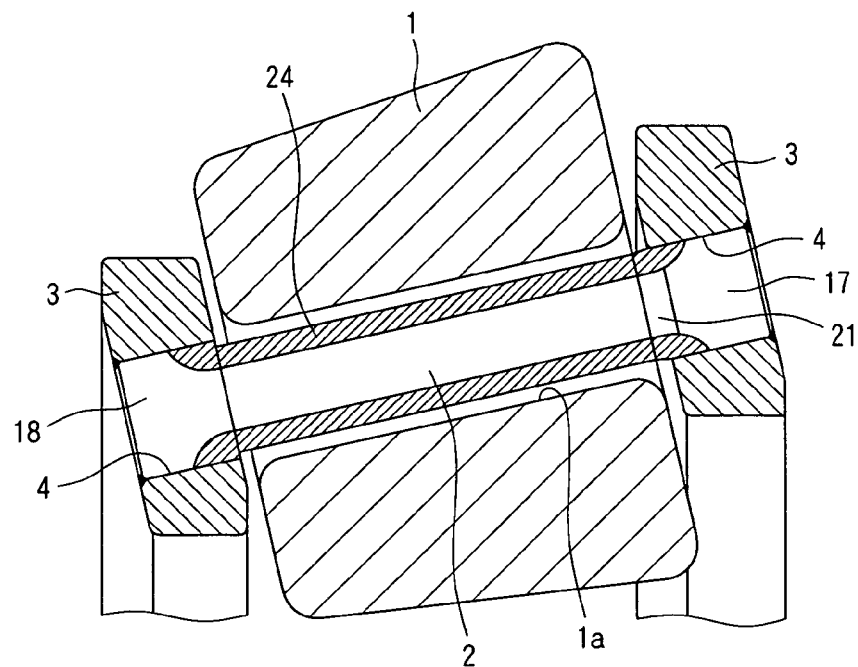
FIG. 32 is a fragmentary cross sectional view of a roller bearing cage according to a ninth embodiment of the present invention.
Figure 33:
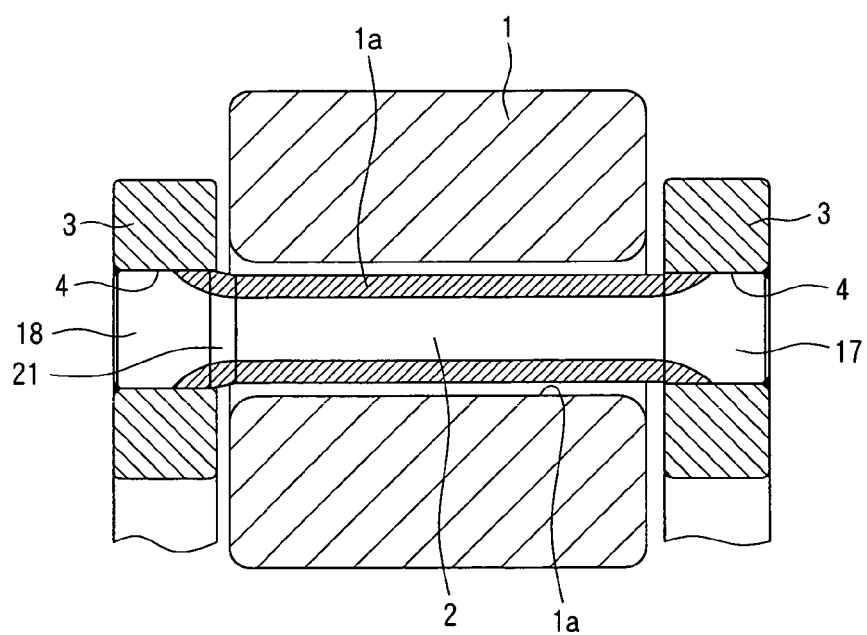
FIG. 33 is a view showing an embodiment of applying the present invention to a cylindrical roller bearing.
Figure 34:
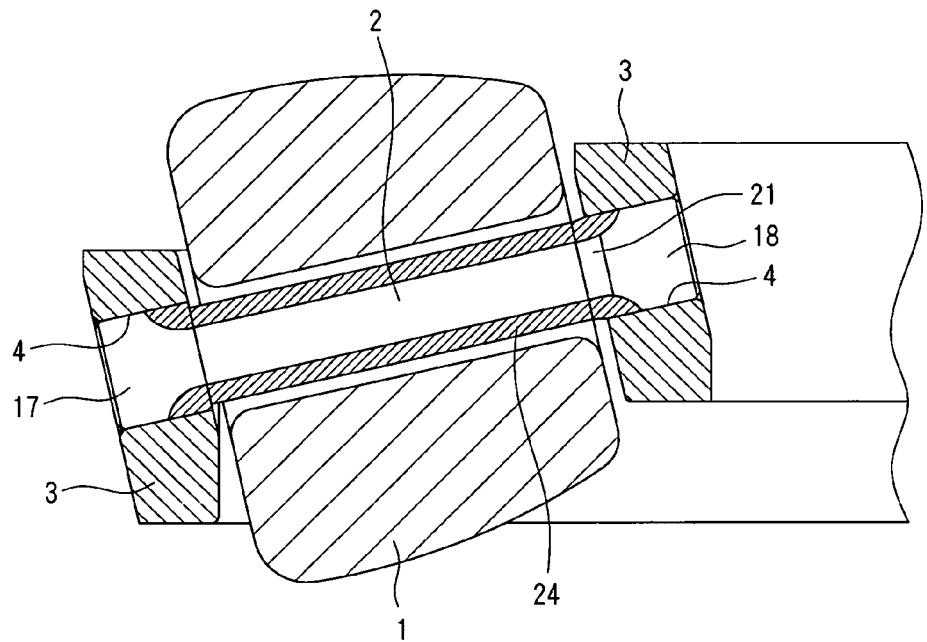
FIG. 34 is a view showing an embodiment of applying the present invention to a radial self-aligning roller bearing.
Figure 35:
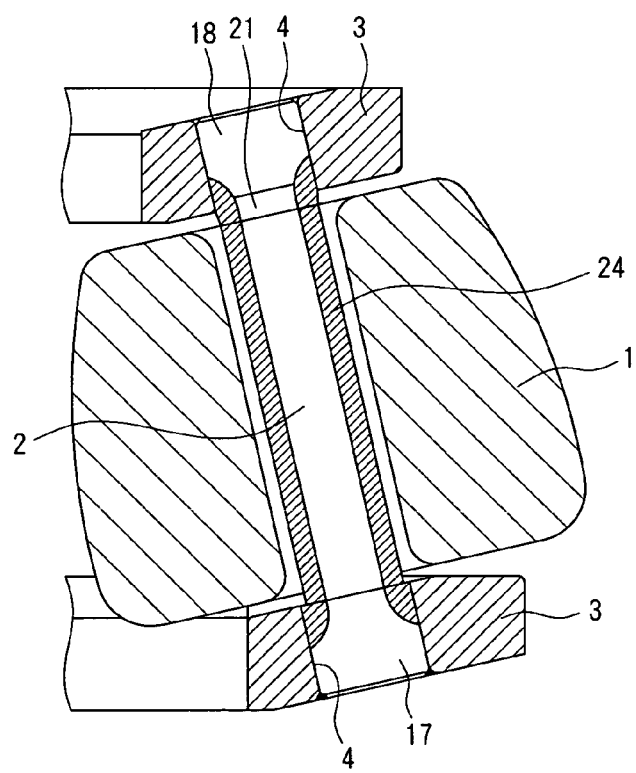
FIG. 35 is a view showing an embodiment of applying the present invention to a thrust self-aligning roller bearing.
Figure 36:
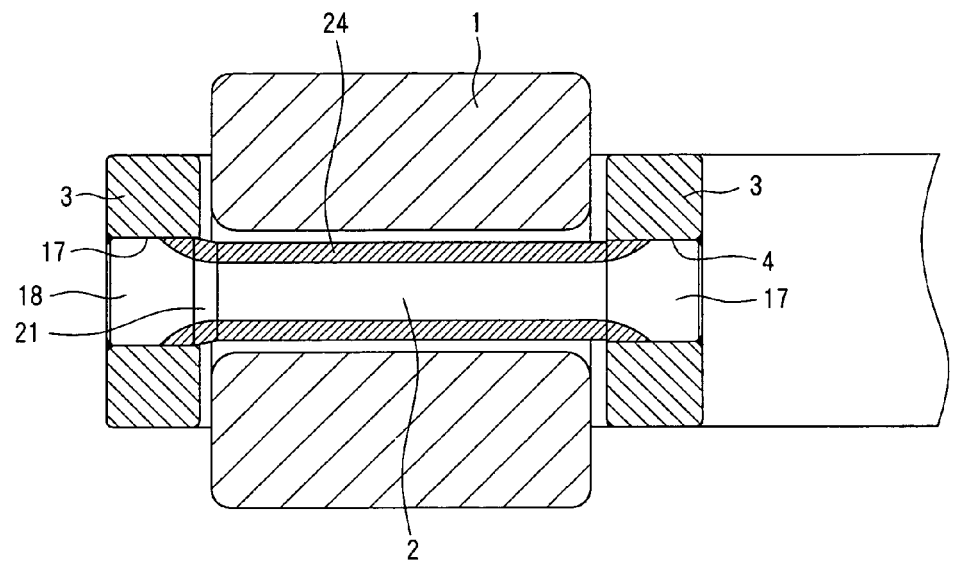
FIG. 36 is a view showing an embodiment of applying the present invention to a thrust cylindrical roller bearing.
Figure 37:
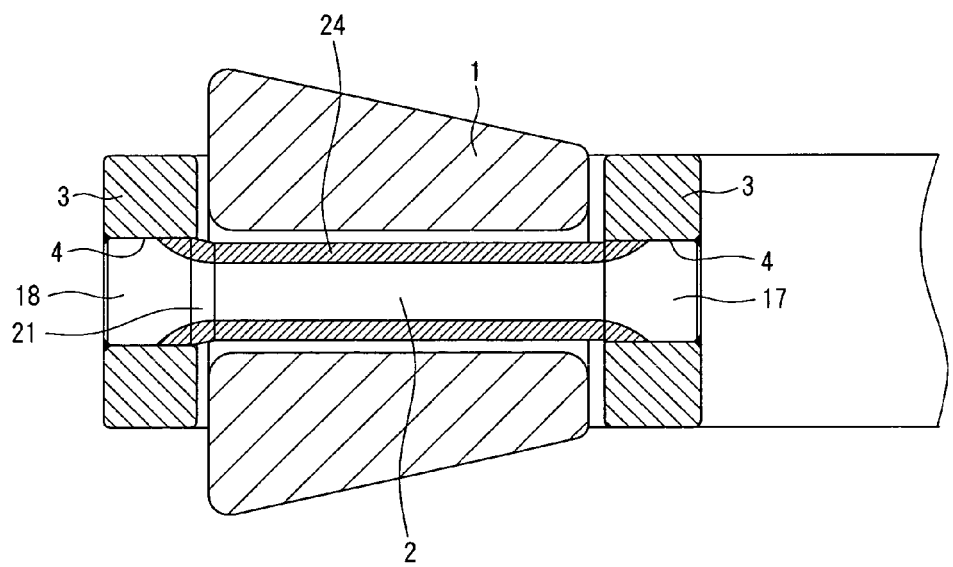
FIG. 37 is a view showing an embodiment of applying the present invention to a thrust tapered roller bearing.

The present invention is not restricted to the embodiment described above. For example, while the tapered portion 21 is formed between the rear end (fitting portion 18) and the shaft portion 2c of the pin 2 in the seventh embodiment shown in FIG. 30, a tapered portion 21 may also be formed between a fitting portion 17 formed at the other end of the pin 2 and the shaft portion 2c as shown in the eighth embodiment shown in FIG. 32. Further, while the case of applying the present invention to the pin-type cage of the tapered roller bearing is exemplified in the seventh and eighth embodiments, the present invention is applicable also to a cylindrical roller bearing as shown in FIG. 33, or a self-aligning roller bearing as shown in FIG. 31. Further, while an example of applying the present invention to a pin-type cage for the radial roller bearing is exemplified in each of the embodiment shown in FIG. 30, FIG. 32 to FIG. 34, the present invention is applicable, for example, also to a thrust self-aligning roller bearing as shown in FIG. 35, a thrust cylindrical roller bearing as shown in FIG. 36, and a thrust tapered roller bearing as shown in FIG. 37.

Then, a ninth embodiment of the present invention is to be described with reference to FIG. 38 to FIG. 40.

Figure 38:
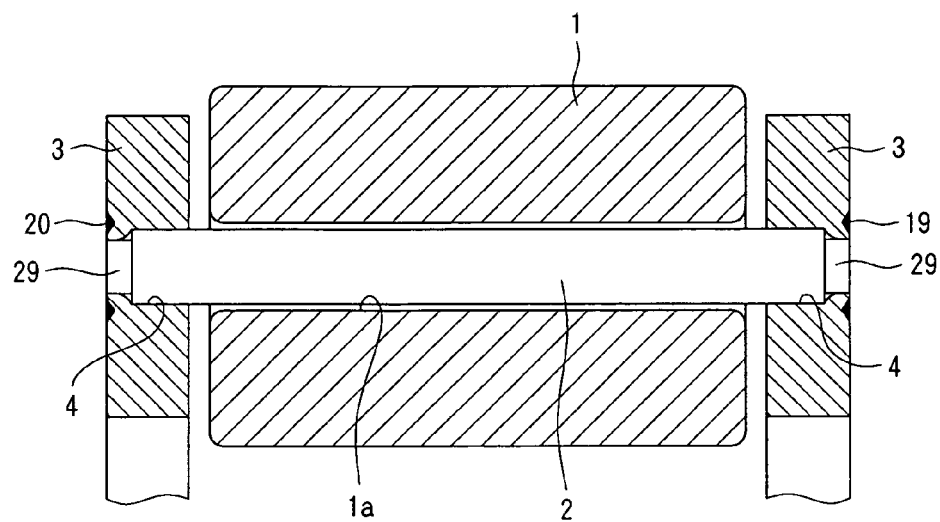
FIG. 38 is a fragmentary cross sectional view of the roller bearing cage according to a tenth embodiment of the present invention.

A pin-type cage according to the ninth embodiment of the present invention comprises, as shown in FIG. 38, a plurality of pins 2 (only one of them is shown in the drawing) for rotatably supporting rolling elements 1 of a cylindrical roller bearing and a pair of annular side plates 3, 3 for retaining the rolling elements 1 by way of the pins each at an equal-distance in the circumferential direction of the bearing ring (not illustrated). A plurality of pin-receiving holes 4 are perforated in each of annular side plates 3 for fitting the end of the pin 2 by interference fit for 5 μm to 40 μm.

Both ends of the pin 2 fitting into the pin-receiving hole 4 are welded respectively to the annular side plate 3, and weld portions 19, 20 for the pin 2 and the annular side plate are formed each in a ring shape substantially at a constant welding width to the outer lateral surface of the annular side plate 3.

The rolling element 1 has a pin insertion hole 1a for inserting the pin 2 therethrough at an axial core portion, and a smaller shaft portion 29 with a diameter smaller than the outer diameter of the pin 2 is formed coaxially with the pin 2 at both ends of the pin 2 passing through the pin insertion hole 1a.

Figure 39:
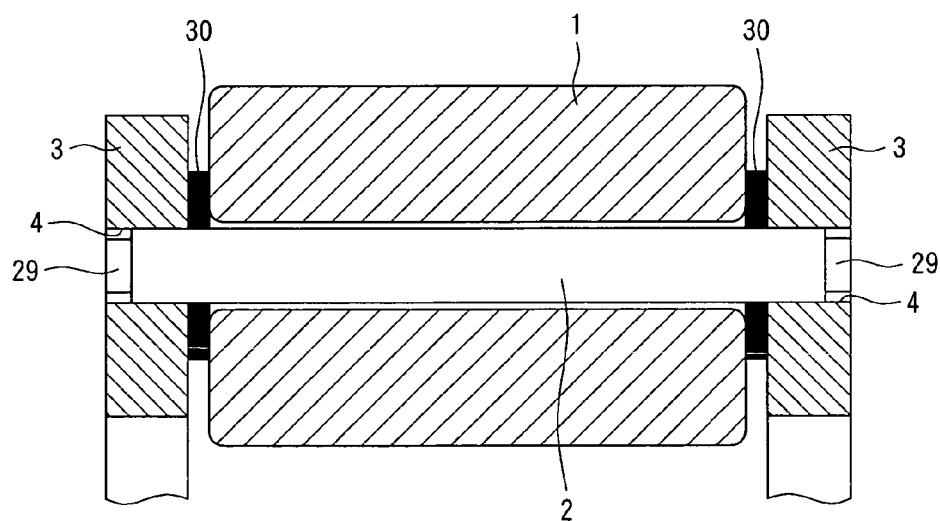
FIG. 39 is a view for explaining a step of fitting pin of a cage into a pin-receiving hole of an annular side plate.

In a case of assembling the pin-type cage as described above, a spacer 30 for dimensional adjustment is at first attached at both ends of a pin 2 protruding from both end faces of a rolling element 1 as shown in FIG. 39 and then both ends of the pin 2 are fitting into a pin-receiving hole 4 formed in an annular side plate 3. Then, as shown in FIG. 40, the outer lateral surface of the annular side plate 3 is plastically deformed into a concave shape by a caulking jig 31 and, after caulking the outer circumferential surface of the smaller diameter shaft portion 29 formed to both ends of the pin 2, the both ends of the pin 2 and the annular side plates 3 are joined by welding.

As described above, since the fitting between the pin-receiving holes 4 formed in the annular side plate 3 and the pin 2 is applied as interference fit for about 5 μm to 40 μm, the joining strength between the pin 2 and the annular side plate 3 can be ensured without forming the weld portions 19, 20 for the pin 2 and the annular side plate 3 as in the weld portion shown in FIG. 4. Accordingly, even when a load in the rotational direction (circumferential direction) exerts on the pin, occurrence of stress concentration to the weld portion for the pin and the annular side plate can be suppressed.

Figure 40A:
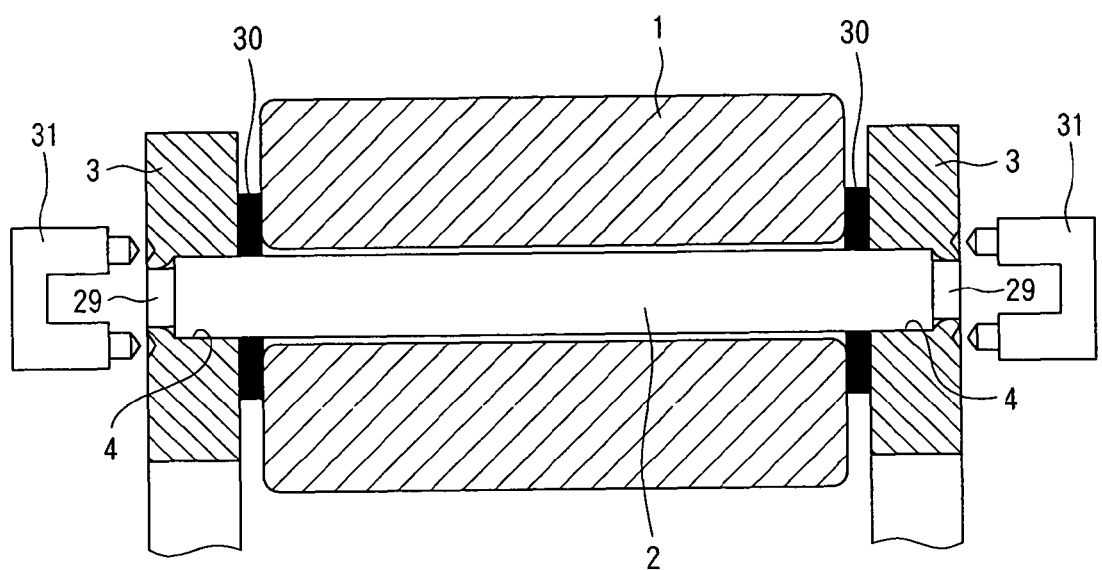
FIG. 40 is a view for explaining the step of caulking a small diametrical shaft portion of a pin fitting into a pin-receiving hole of an annular side plate.
Figure 40B:
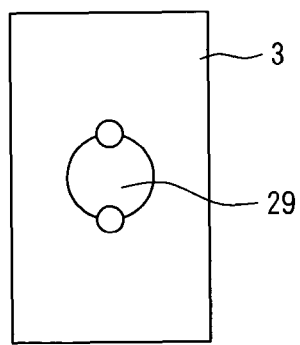

Further, since the smaller diameter shaft portion 29 of a diameter smaller than the outer diameter of the pin 2 are disposed on both ends of the pin 2, a portion of the annular side plate 3 can easily be deformed plastically by the caulking jig 31 upon caulking both ends of the pin 2 fitting into the pin-receiving hole 4 of the annular side plate 3 by the caulking jig 31 shown in FIG. 40. Accordingly, the pin 2 can be fixed firmly to the annular side plate 3 even when the pin 2 and the pin-receiving hole 4 are fitted by interference fit for 40 μm to 60 μm.

Then, a tenth embodiment of the present invention is to be described with reference to FIG. 41 to FIG. 43.

Figure 41:
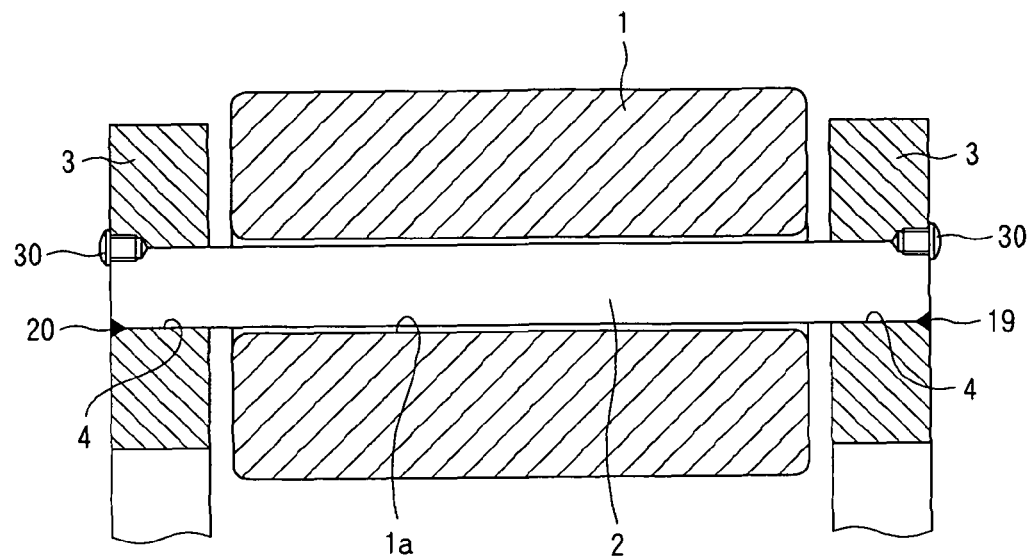
FIG. 41 is a fragmentary cross sectional view of a roller bearing cage according to an eleventh embodiment of the present invention.

A pin-type cage for use in a roller bearing according to the tenth embodiment of the present invention comprises, as shown in FIG. 41, a plurality of pins 2 (only one of them is shown in the drawing) for rotatably supporting rolling elements 1 of a cylindrical roller bearing and a pair of annular side plates 3, 3 for retaining the rolling elements 1 by way of the pins each at an equal-distance in the circumferential direction of the bearing ring (not illustrated). In each of the annular side plates 3, a plurality of pin-receiving holes 4 that are fitted with the ends of the pin 2 by interference fit for 5 μm to 40 μm are perforated respectively.

Both ends of the pin 2 are welded respectively to the annular side plate 3, weld portions 19, 20 for the pin 2 and the annular side plate are formed each in a ring shape substantially at a constant welding width to the outer lateral surface of the annular side plate 3, and a setting screw 30 for setting the pin 2 and the annular side plate 3 is screwed therein.

Figure 42:
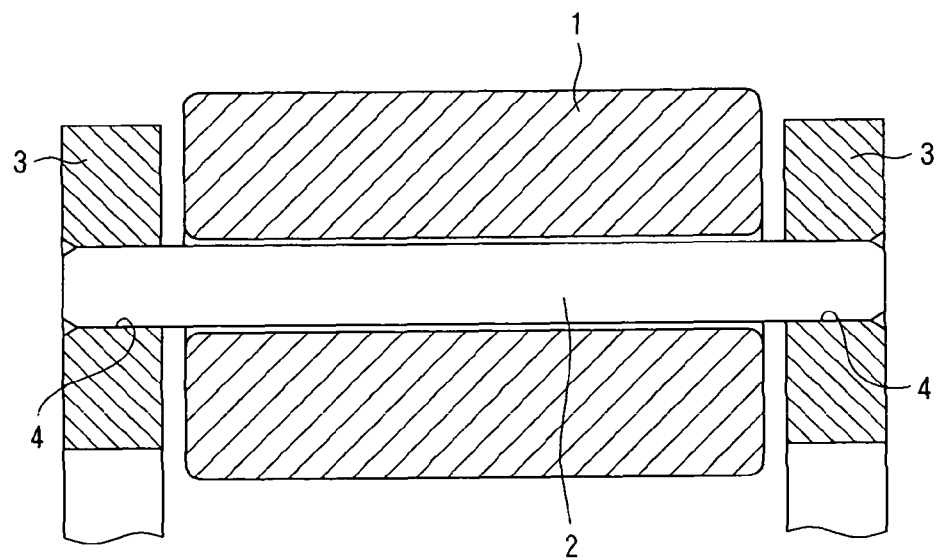
FIG. 42 is a view for explaining a step of fitting a pin of a cage into a pin-receiving hole of an annular side plate.
Figure 43:
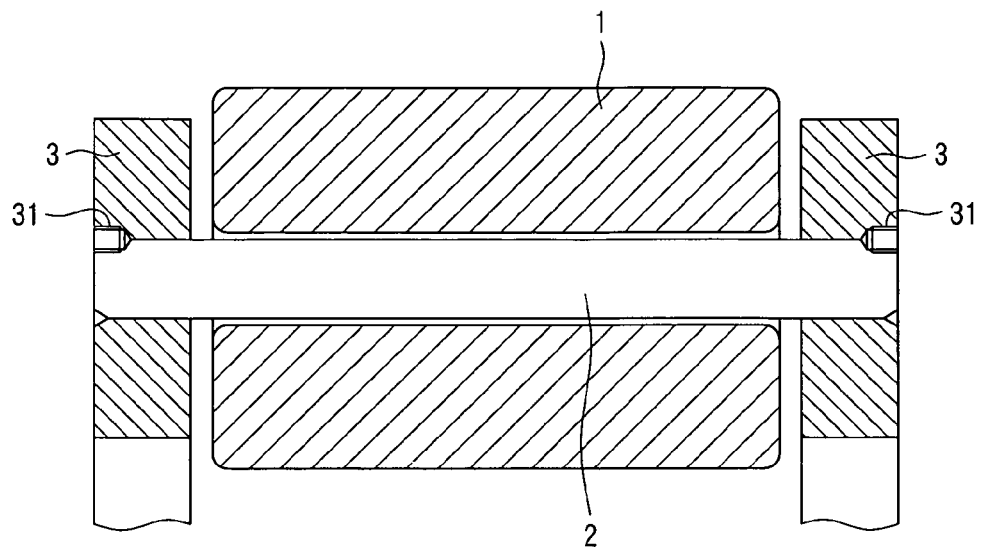
FIG. 43 is a view for explaining a step of forming a tap hole to the end face of a pin fitting into the pin-receiving hole of an annular side plate.
Figure 44:
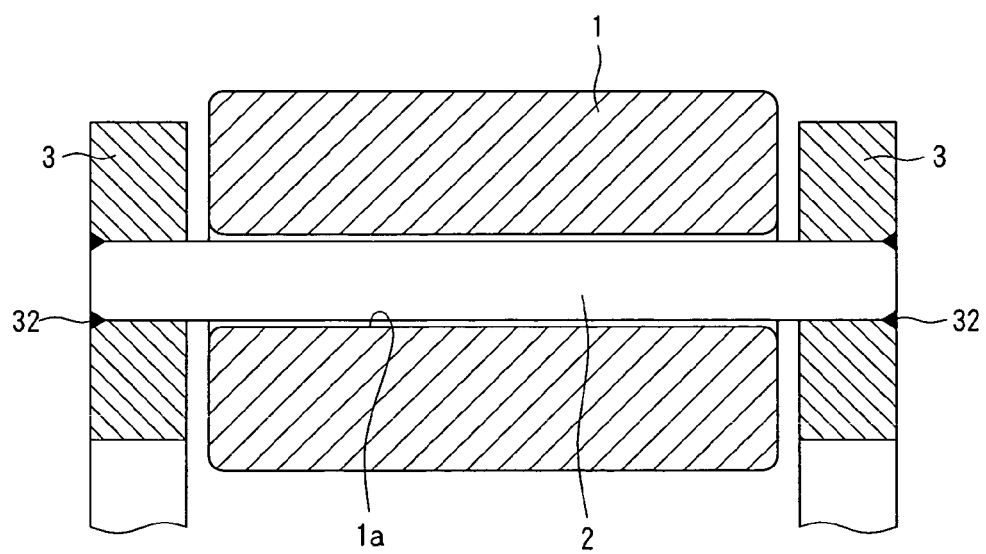
FIG. 44 is a fragmentary cross sectional view of a roller bearing cage according to a twelfth embodiment of the present invention.

In a case of assembling the pin-type cage as described above, both ends of the pin 2 protruding from the both end faces of the rolling element 1 are at first fitting into the pin-receiving hole 4 formed in the annular side plate 3 as shown in FIG. 42. Then, as shown in FIG. 43, a tap hole 31 is formed to both end faces of the pin fitting into the pin-receiving hole 4, and a setting screw 30 is screwed into the tap hole 31 to fix the pin 2 and the annular side plate 3 and then both ends of the pin 2 are joined by welding to the annular side plate 3.

As described above, since fitting between the pin-receiving holes 4 formed in the annular side plate 3 and the pin 2 is applied as interference fit for about 5 μm to 40 μm, joining strength between the pin 2 and the annular side plate 3 can be ensured without forming the weld portions 19, 20 for the pin 2 and the annular side plate 3 as in the weld portion shown in FIG. 4. Accordingly, even when a load in the rotational direction (circumferential direction) exerts on the pin, occurrence of stress concentration to the weld portion for the pin and the annular side plate can be suppressed.

Then, an eleventh embodiment of the present invention is to be described with reference to FIG. 44 to FIG. 47.

A pin-type cage for use in roller bearing according to a eleventh embodiment of the present invention comprises, as shown in FIG. 41, a plurality of pins 2 (only one of them is shown in the drawing) for rotatably supporting rolling elements 1 of a cylindrical roller bearing and a pair of annular side plates 3, 3 for retaining the rolling elements 1 by way of the pins each at an equal-distance in the circumferential direction of the bearing ring (not illustrated). In each of the annular side plates 3, a plurality of pin-receiving holes 4 that are fitted with the ends of the pin 2 by interference fit for 5 μm to 40 μm are perforated respectively.

Figure 45:
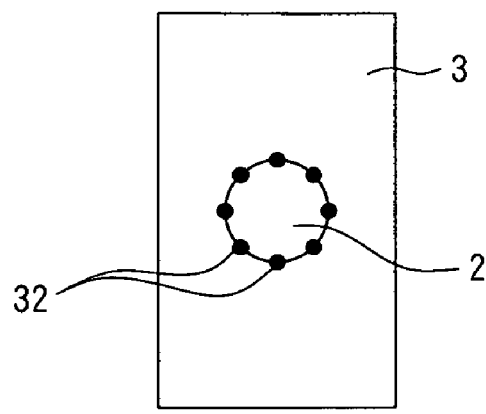
FIG. 45 is a fragmentary cross sectional view of a roller bearing cage according to a twelfth embodiment.
Figures 46A, 46B:
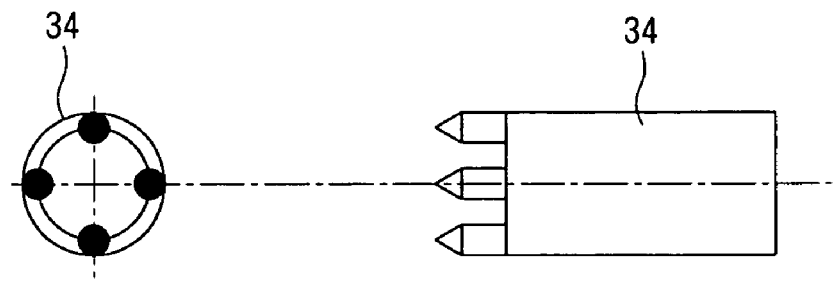
FIG. 46 is a view showing an example of a welding torch used upon welding a pin and an annular side plate.

Both ends of the pin 2 fitting into the pin-receiving holes 4 are welded respectively to the annular side plate 3, and spot weld portions 32 with the pin 2 are formed to the outer lateral surface of the annular side plate 3 as shown in FIG. 45 by a welding torch 33 of a shape shown in FIG. 46.

The present inventors, et al. prepared a pin-type cage in which the pins and the annular side plate were joined by spot welding (welding time: about 14 min) and a pin-type cage in which the pins and the annular side plate were joined by an existent welding method (welding time: about 30 min). Then, a tensile load and a compressive load (load applied: 1600 kg) were repetitively loaded in a state of giving a sinusoidal wave at 20 Hz to the pins of the pin-type cages to investigate the bearing life of tapered roller bearings (outer diameter: 650 mm, inner diameter: 400 mm, width: 250 mm, number of rolling elements: 27, pin diameter: 12.6 mm, cage outer diameter: 580 mm, cage inner diameter: 542 mm) till the base material of the pin was fractured by fatigue. The result is shown in Table 3.

TABLE 3

|  | Life evaluation value |
| --- | --- |
| Example 4 | 10 |
| Comparative Example 3 | 1 |
| Comparative Example 4 | 12 |

In Table 3, Example 4 shows the life evaluation value for a tapered roller bearing in a case of joining the pin and the annular side plate by spot welding, Comparative Example 3 shows the life evaluation value for a tapered roller bearing in a case of not joining the pin and the annular side plate by welding, and Comparative Example 4 shows the life evaluation value for a tapered roller bearing in a case of joining the pin and the annular side plate by welding by an existent method, respectively.

As apparent from the test result shown in Table 3, it can be seen that the same extent of the bearing life as in the existent case can be obtained by joining the pin 2 and the annular plate 3 by spot welding. Accordingly, by joining the pin 2 and the annular side plate 3 by spot welding, occurrence of stress concentration to the weld portion for the pin 2 and the annular side plate 3 can be prevented without greatly lowering the mechanical strength of the cage.

Figure 47:
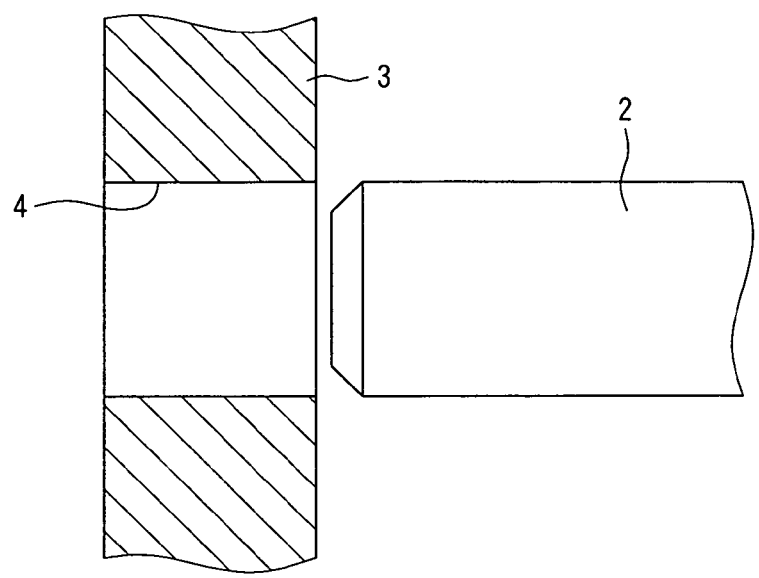
FIG. 47 is a view for explaining a method of cold fitting a pin into a pin-receiving hole of an annular side plate.
Figure 48:
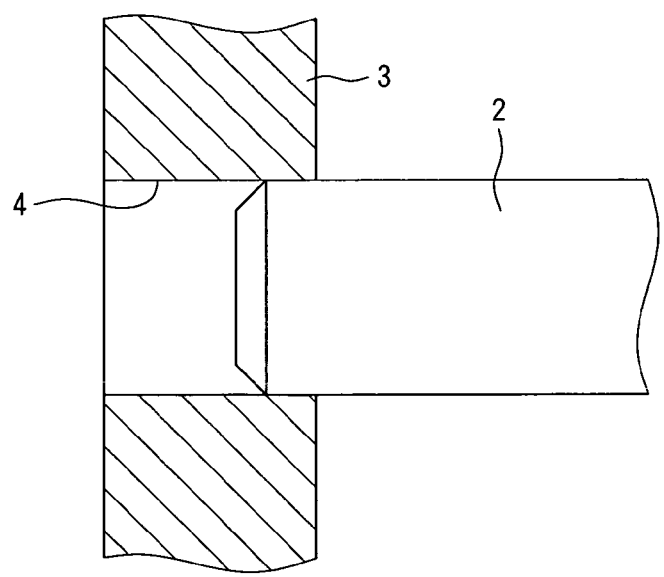
FIG. 48 is a view for explaining a method of shrink fitting a pin-receiving hole of an annular side plate to a pin.

In a case of fitting the end of the pin 2 into the pin-receiving hole 4 formed in the annular side plate 3, it is preferred to adopt a method of cooling the end of the pin 2 and then fitting the end of the pin 2 into the pin-receiving hole 4 (cold fit) as shown in FIG. 47, or a method of heating the peripheral portion of the pin-receiving hole 4 and then fitting the end of the pin 2 into the pin-receiving hole 4 (shrinkage fit) as shown in FIG. 48.

The invention claimed is:

1. A cage for use in a roll bearing, comprising:
a plurality of pins for rotatably supporting rolling elements of a roller bearing; and
a pair of annular side plates for retaining, by way of the pins, the rolling elements each at an equal distance in a circumferential direction of a bearing ring;
wherein pin-receiving holes in which fit one ends of the pins are formed in both of the pair of annular side plates, a fit between the pins and the pin-receiving holes is applied as an interference fit for 5 μm or more and 40 μm or less, and the ends of the pins fitting into the pin-receiving holes are welded to the annular side plates, the annular side plates having weld portions for the pins and the annular side plate at an outer lateral surface, the weld portions being in a ring shape with a substantially constant width;
wherein said one ends of the pins are formed to a smaller diameter than that of the other ends; and
wherein the pins have shaft portions passing through rolling element insertion holes formed in the axial cores of the rolling elements and the two ends of the pins fitting into the pin-receiving holes are formed each to a larger diameter than that of the shaft portions.

2. A cage for use in a roller bearing according to claim 1, wherein the weld portions are formed by TIG welding or plasma welding for the pin and the annular side plate.

3. A cage for use in a roller bearing according to claim 2, wherein the extension amount of the weld portions of the annular side plate relative to the outer lateral surface thereof is within 0.5 mm.

4. A cage for use in a roller bearing according to claim 2, wherein the pins each have a chamfered portion at the top end face thereof.

5. A cage for use in a roller bearing according to claim 4, wherein the chamfered portion is formed at an angle of inclination of 30° or less relative to the outer circumferential surface of the pin.

6. A cage for use in a roller bearing according to claim 3, wherein the pins each have a chamfered portion at the top end face thereof.

7. A cage for use in a roller bearing according to claim 1, wherein the pin-receiving holes have a surface roughness of 1.2 μm or less.

8. A cage for use in a roller bearing according to claim 1, wherein the pin-receiving holes each have a chamfered portion at the inner surface of the annular side plate.

9. A cage for use in a roller bearing according to claim 1, wherein the pins each have a tapered portion between the shaft portion and a rear end thereof.

10. A cage for use in a roller bearing according to claim 9, wherein the angle of inclination for the tapered portion is 30° or less relative to the outer circumferential surface of the pin.

11. A cage for use in a roller bearing according to claim 1, wherein the pins each have a surface hardening layer at a surface layer of the shaft portion.

12. A cage for use in a roller bearing according to claim 11, wherein it is defined as:

$$L_1 > L_3 > L_1 - 2L_2$$

when assuming the entire length of the pin as $L_1$, the axial length between the two ends of the pin as $L_2$, and the region for forming the surface hardening layer in the axial direction of the pin as $L_3$.

13. A cage for use in a roller bearing according to claim 11, wherein it is defined as:

$$L_1 - 2T > L_3 > L_1 - 2L_2$$

when assuming the region for forming the surface hardening layer in the axial direction of the pin as $L_3$ and the thickness of the annular side plate as T.

14. A cage for use in a roller bearing according to claim 11, wherein the surface hardening layer is formed to the circumferential surface of the pin by controlling an RF current supplied to RF induction heating coils used upon RF quenching of the circumferential surface of the pin, and a relative moving speed of the high frequency induction heating coils to the pin separately for both ends of the pin and other portions.

15. A cage for use in a roller bearing according to claim 1, wherein the ends of the pins fitting into the pin-receiving holes are welded to the annular side plate, the annular side plate has weld portions for the pins and the annular side plate at the outer lateral surface, and the weld portions are formed into a ring shape substantially at a constant width.

16. A cage for use in a roll bearing, the cage comprising:
a plurality of pins for rotatably supporting rolling elements of a roller bearing; and
a pair of annular side plates for retaining, by way of the pins, the rolling elements each at an equal distance in a circumferential direction of a bearing ring;
wherein pin-receiving holes in which fit one ends of the pins are formed in both of the pair of annular side plates, a fit between the pins and the pin-receiving holes is applied as an interference fit for 5 μm or more and 40 μm or less, and the ends of the pins fitting into the pin-receiving holes are welded to the annular side plates, the annular side plates having weld portions for the pins and the annular side plates at an outer lateral surface, the weld portions being in a ring shape with a substantially constant width;

wherein ones of the two ends of the pins are formed to a smaller diameter than that of the others of the two ends;

wherein the pins have shaft portions passing through rolling element insertion holes formed in the axial cores of the rolling elements and the two ends of the pins fitting into the pin-receiving holes are formed each to a larger diameter than that of the shaft portions; and wherein the pins have chamfered portions at top end faces thereof.

* * * * *